(12) United States Patent
Dutta et al.

(10) Patent No.: US 10,472,271 B2
(45) Date of Patent: Nov. 12, 2019

(54) GLASS WITH MODIFIED SURFACE LAYER

(71) Applicant: CORNING INCORPORATED, Corning, NY (US)

(72) Inventors: Indrajit Dutta, Horseheads, NY (US); Nicholas James Smith, Horseheads, NY (US)

(73) Assignee: CORNING INCORPORATED, Corning, NY (US)

(*) Notice: Subject to any disclaimer, the term of this patent is extended or adjusted under 35 U.S.C. 154(b) by 229 days.

(21) Appl. No.: 15/155,161

(22) Filed: May 16, 2016

(65) Prior Publication Data
US 2016/0340226 A1 Nov. 24, 2016

Related U.S. Application Data

(60) Provisional application No. 62/190,832, filed on Jul. 10, 2015, provisional application No. 62/163,510, filed on May 19, 2015.

(51) Int. Cl.
*C03C 3/083* (2006.01)
*C03C 23/00* (2006.01)
*C03C 4/14* (2006.01)
*C03C 4/20* (2006.01)

(52) U.S. Cl.
CPC ............. *C03C 3/083* (2013.01); *C03C 4/14* (2013.01); *C03C 4/20* (2013.01); *C03C 23/009* (2013.01); *C03C 2204/00* (2013.01)

(58) Field of Classification Search
CPC ............. C03C 23/009; C03C 21/003
See application file for complete search history.

(56) References Cited

U.S. PATENT DOCUMENTS

| | | |
|---|---|---|
| 3,174,919 A | 3/1965 | Spremulli |
| 3,811,855 A | 5/1974 | Carlson et al. |
| 3,879,183 A | 4/1975 | Carlson |
| 5,192,402 A | 3/1993 | Araujo et al. |
| 5,648,172 A | 7/1997 | Jousse et al. |
| 7,176,528 B2 | 2/2007 | Couillard et al. |
| 7,619,283 B2 | 11/2009 | Gadkaree |

(Continued)

FOREIGN PATENT DOCUMENTS

| | | | |
|---|---|---|---|
| DE | 844650 C1 | 7/1952 | |
| EP | 1433758 A1 * | 6/2004 | ............. C03C 3/083 |

(Continued)

OTHER PUBLICATIONS

Cordeiro et al. ("Dependence of depletion-layer thickness on applied voltage in thermally poled fused silica," Bragg Gratings, Photosensitivity and Poling in Glass Waveguides, pp. 411-413, 1999) (Year: 1999).*

(Continued)

*Primary Examiner* — David Sample

(57) ABSTRACT

Embodiments of a glass substrate including an alkali-containing bulk and an alkali-depleted surface layer, including a substantially homogenous composition are disclosed. In some embodiments, the alkali-depleted surface layer includes about 0.5 atomic % alkali or less. The alkali-depleted surface layer may be substantially free of hydrogen and/or crystallites. Methods for forming a glass substrate with a modified surface layer are also provided.

17 Claims, 33 Drawing Sheets

(56) References Cited

U.S. PATENT DOCUMENTS

| | | | |
|---|---|---|---|
| 2013/0059716 A1* | 3/2013 | Fechner | ............ C03C 3/087 501/14 |
| 2013/0224491 A1* | 8/2013 | Smedskjaer | ............ C03C 3/085 428/410 |
| 2014/0120311 A1 | 5/2014 | Smith | |

FOREIGN PATENT DOCUMENTS

| | | |
|---|---|---|
| FR | 2696443 A1 | 4/1994 |
| WO | 2013082246 A1 | 6/2013 |
| WO | 1654349 | 4/2016 |

OTHER PUBLICATIONS

International Search Report and Written Opinion PCT/US2016/033013 dated Sep. 23, 2016.
Dussauze, M., T. Cremoux, et al. (2012). International Journal of Applied Glass Science 3(4): 309-320.
Fleming, S. and H. An, Frontiers of Optoelectronics in China, 2010. 3(1): p. 84-91.
Smith, N. J. (2011). Novel Approaches to the Surface Modification of Glass by Thermal Poling. Material Sci. and Engr. University Park, PA, The Pennsylvania State University. Ph.D.
Carlson, D.E., Ion Depletion of Glass at a Blocking Anode: I, Theory and Experimental Results for Alkali Silicate Glasses. Journal of the American Ceramic Society, 1974. 57(7): p. 291-294.
Carlson, D.E., K.W. Hang, and G.F. Stockdale, Ion Depletion of Glass at a Blocking Anode: II, Properties of Ion-Depleted Glasses. Journal of the American Ceramic Society, 1974. 57(7): p. 295-300.

* cited by examiner

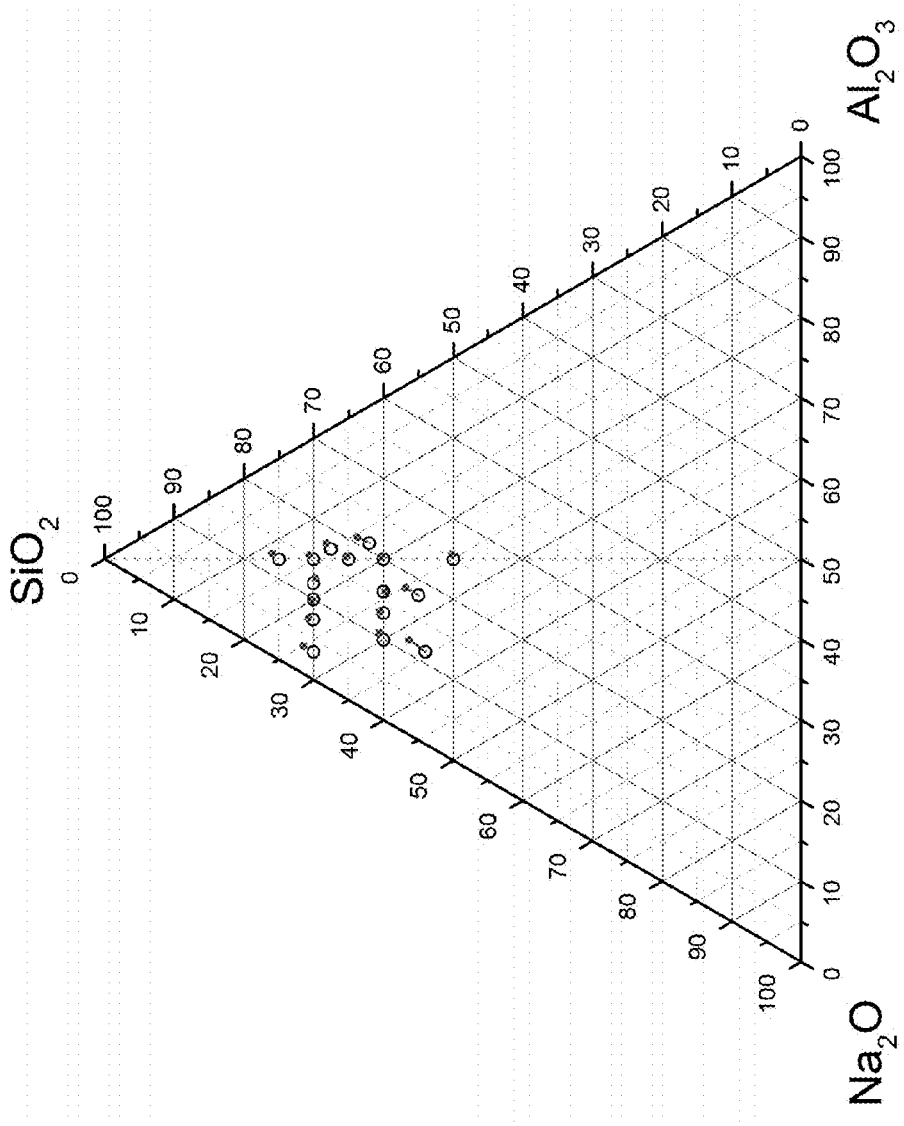

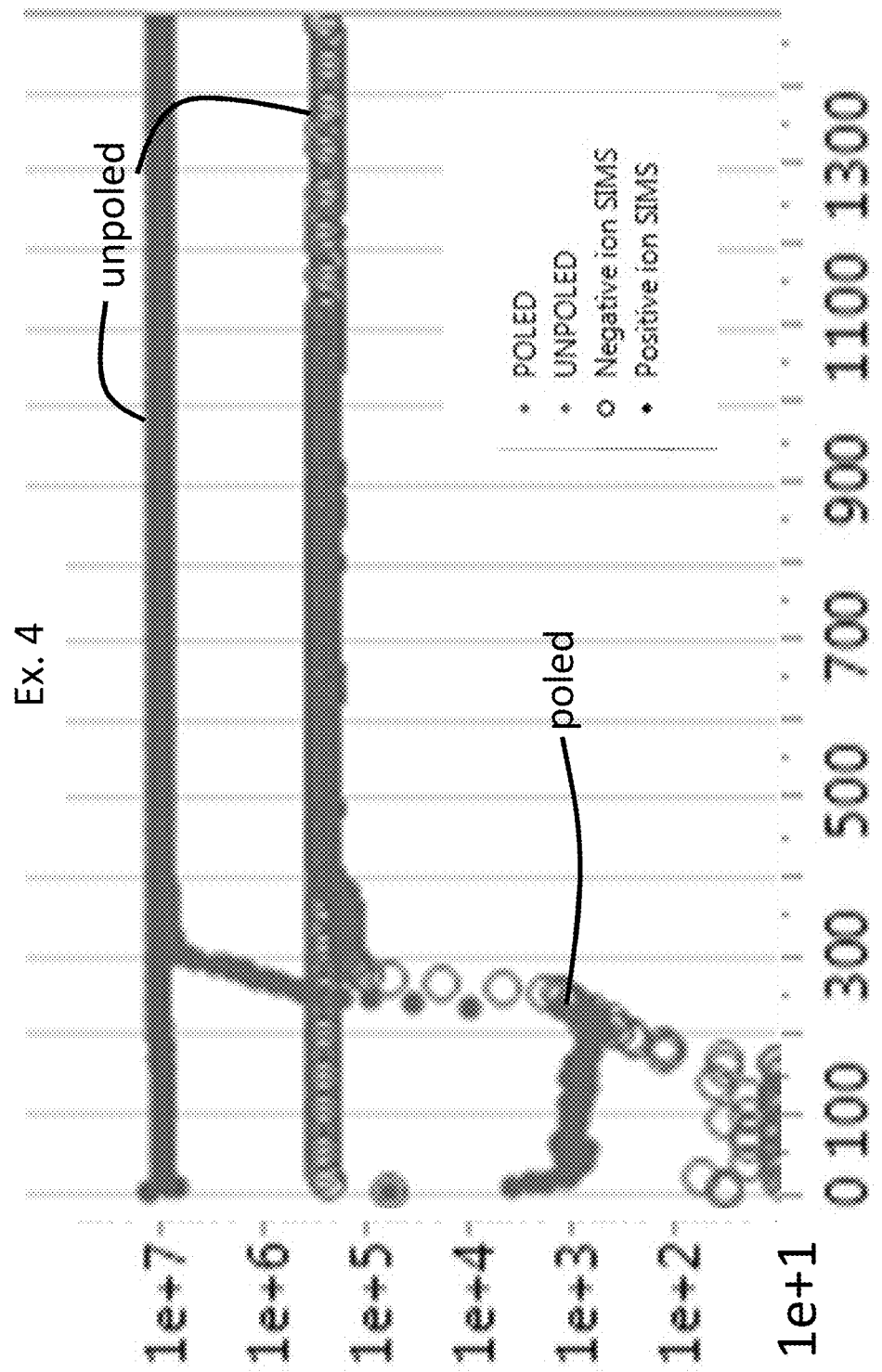

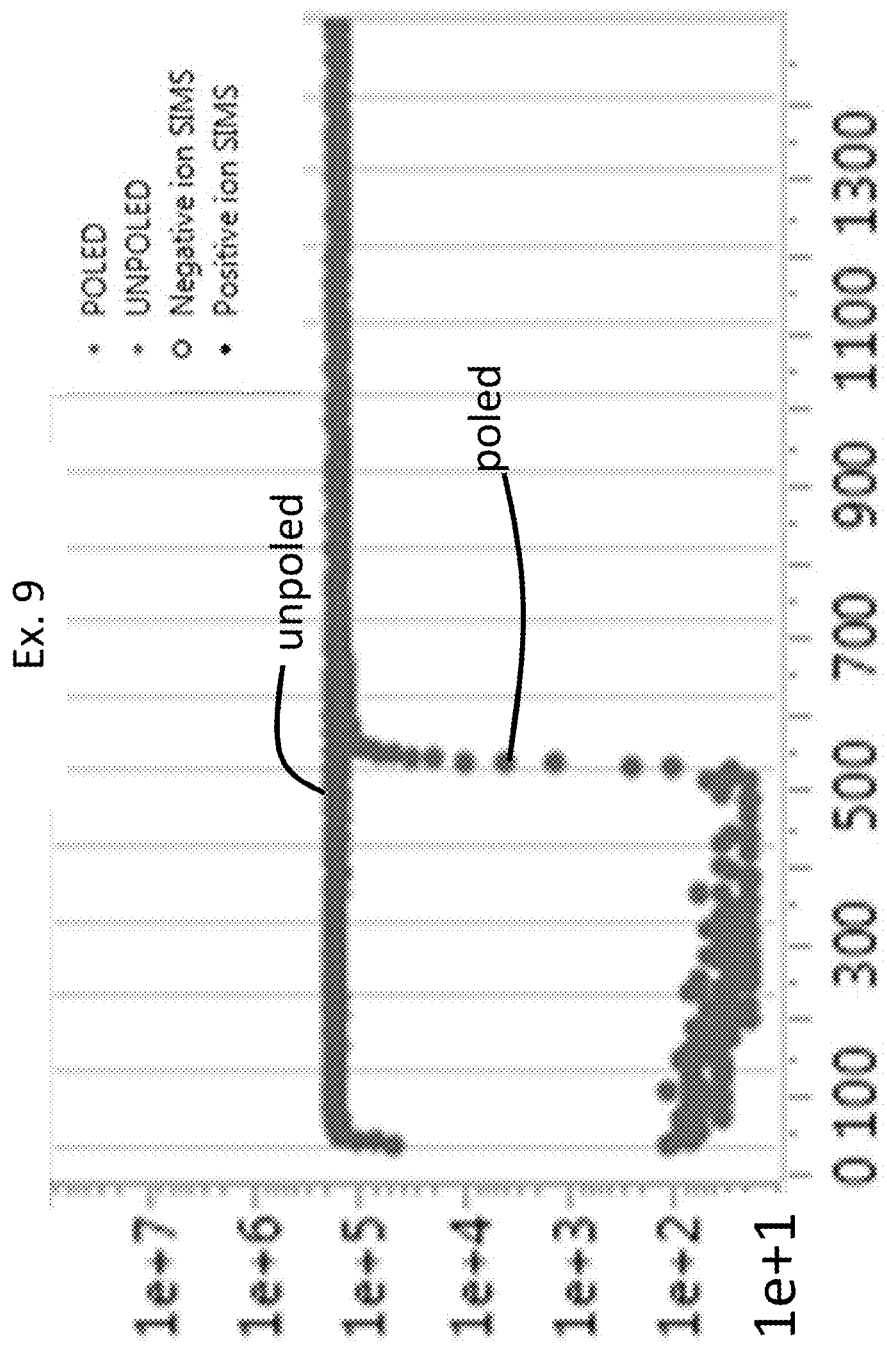

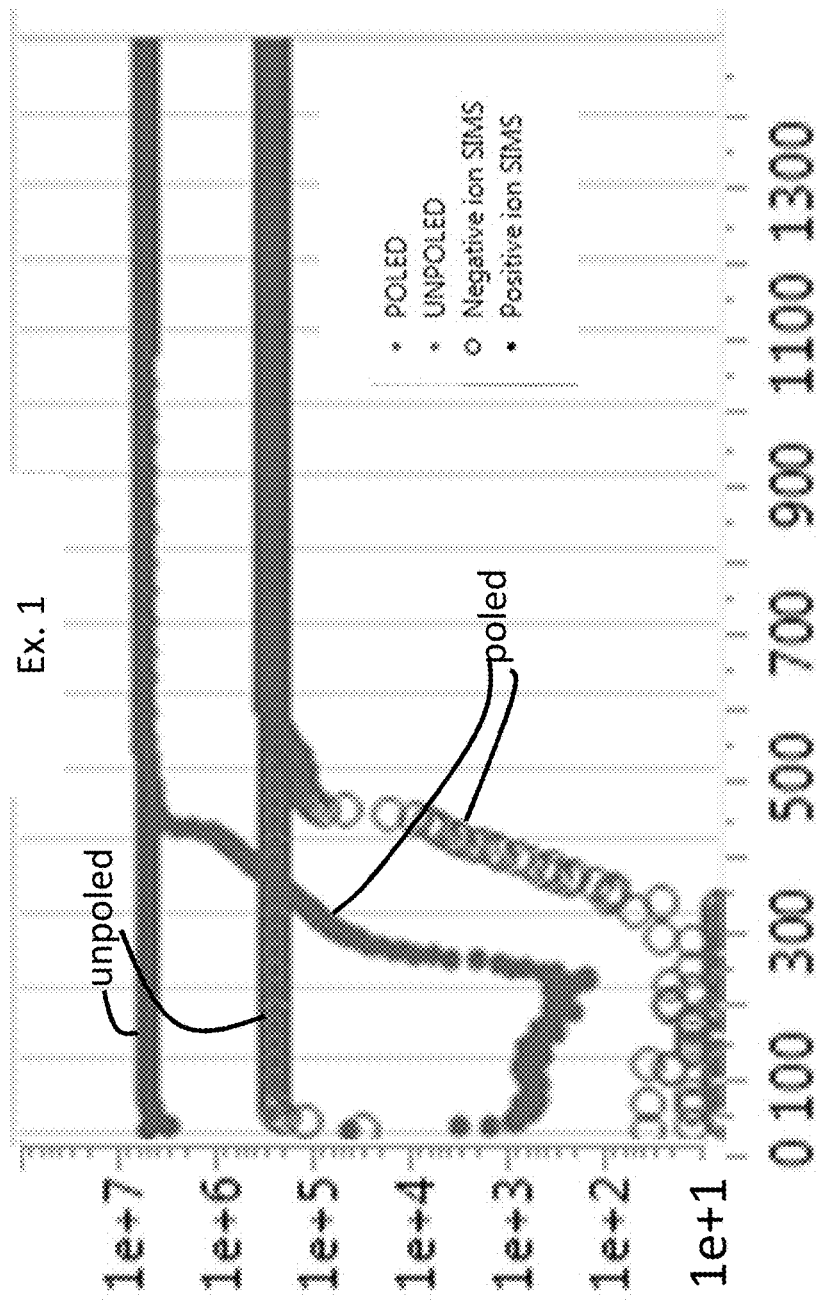

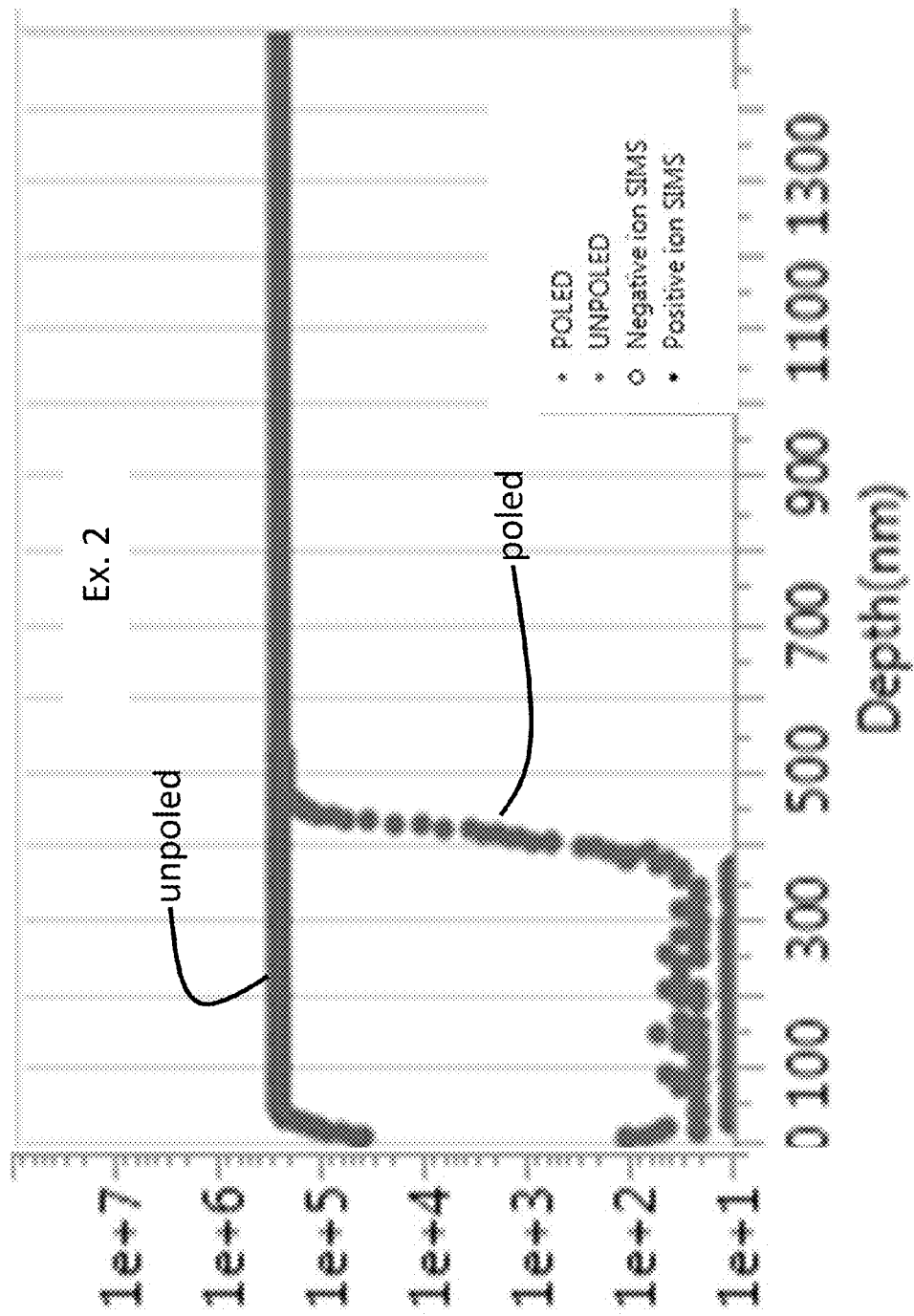

Ex. 3

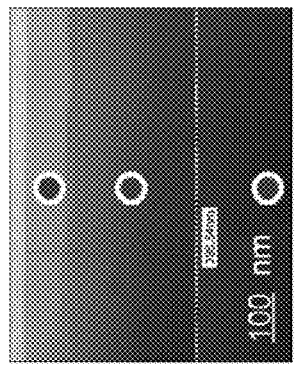
FIGURE 9
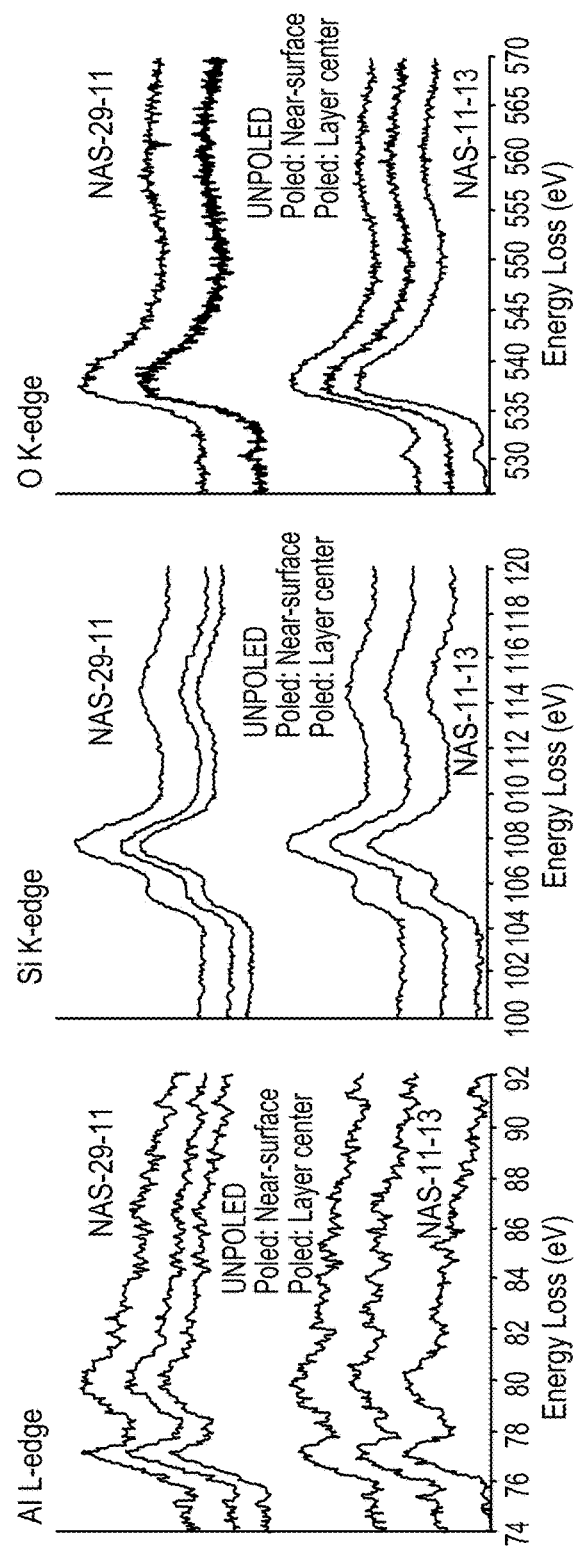

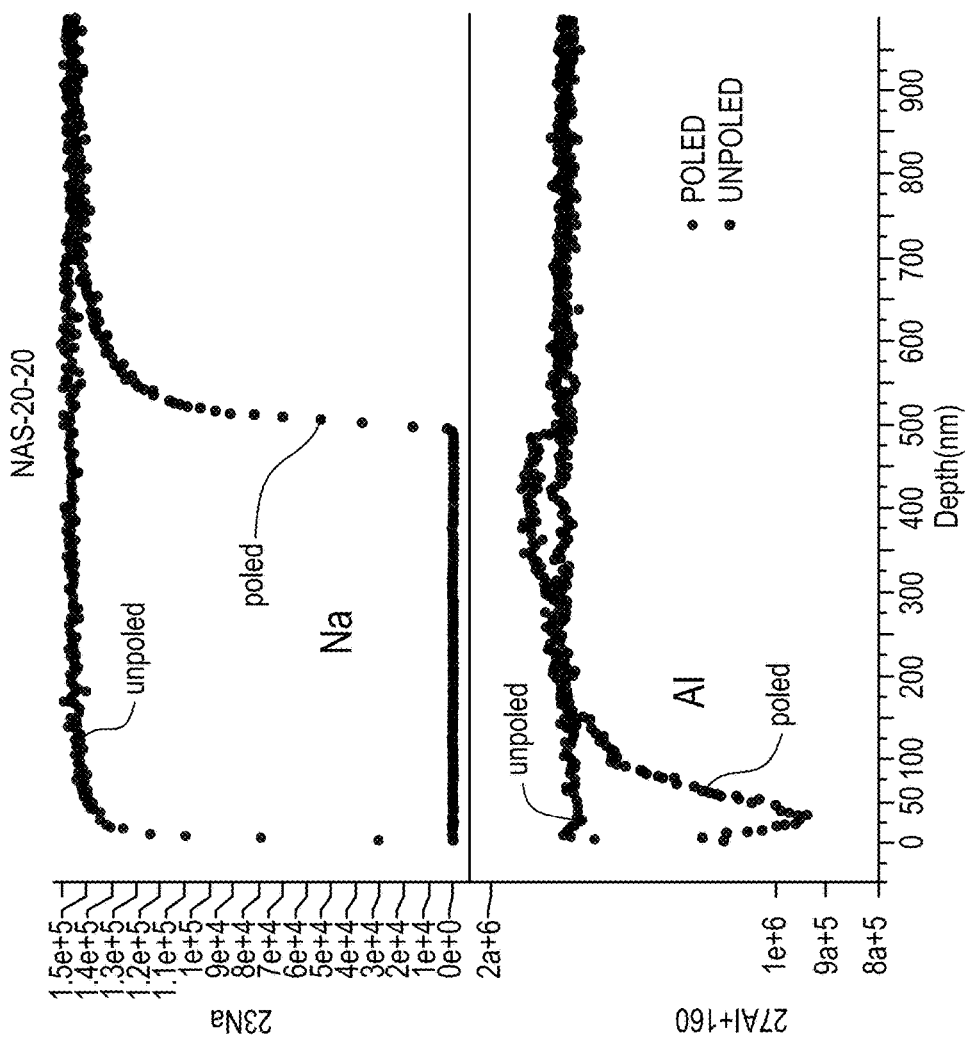

GLASS WITH MODIFIED SURFACE LAYER

CROSS-REFERENCE TO RELATED APPLICATIONS

This application claims the benefit of priority under 35 U.S.C. § 119 of U.S. Provisional Application Ser. No. 62/190,832 filed on Jul. 10, 2015 and U.S. Provisional Application Ser. No. 62/163,510 filed on May 19, 2015, the content of which is relied upon and incorporated herein by reference in its entirety.

BACKGROUND

The disclosure relates to glass substrates with a modified surface layer, and more particularly to glass substrates with an alkali-containing bulk and an alkali-depleted surface layer.

Glasses formed or treated using known surface treatment (e.g., including melt-prepared glasses) often include surface layers that are at least partially crystallized or include crystallized portions, or may exhibit phase separation (i.e., a nonhomogeneous composition, typically including 5, 6-coordinated aluminum). In other known methods or applications used to modify surface layers (e.g., leaching or wet chemical treatments), the resulting surface layer includes hydrogen, which may be present in the form of $H^+$, $H_3O^+$, $H_2O$ or combinations thereof.

Thermal poling has been utilized to modify the properties of glass. Thermal poling generally involves the application of voltage to a glass. Known uses of thermal poling include the formation of depletion layers that inhibit alkali migration in photovoltaic glasses, the formation of interfacial barrier layers between display (or alkali-free) glass and silicon, and the formation of surface texture or selective-area ion exchange through the use of patterned electrodes.

Thermal poling is also used in the art to induce second-order nonlinear properties, especially second-order nonlinear optical properties, for the purpose of creating optical switches and devices. Poling methods are also closely analogous to so-called anodic bonding, which is applied to bond alkali-containing or alkali-free glasses to other materials, especially semiconductors.

The instant disclosure discloses glass substrates having a variety of compositions in the aluminosilicate family and a surface layer with a modified composition and atomic structure. In some embodiments, the surface layer is has a reduced concentration of alkali, while the bulk of the glass substrate includes alkali. The surface layer includes an atomic structure that is believed to be substantially enriched in 3-coordinated oxygen (also referred to herein as oxygen in a 3-coordinated state or oxygen triclusters) and which enable various surface properties and performance attributes of the glass substrate. For example, the surface layer can be used to improve the corrosion resistance, diffusion barrier, hardness, elastic modulus, fatigue resistance and damage resistance (e.g., anomalous deformation) of the glass substrate.

SUMMARY

A first aspect of this disclosure pertains to a glass substrate including an alkali-containing bulk and an alkali-depleted surface layer, wherein the alkali-depleted surface layer comprises a substantially homogenous composition. As used herein, the phrase "substantially homogeneous composition" refers to a composition that does not exhibit any phase separation or very little phase separation. As used herein, alkali-depleted means the surface layer comprises alkali in a concentration less than the concentration present in the alkali-containing bulk. In some embodiments, the concentration of alkali in the alkali-depleted surface layer is about 0.5 atomic % or less. In such embodiments, in which the alkali concentration is about 0.5 atomic % or less (e.g., about 0.4 atomic % or less, about 0.3 atomic % or less, about 0.2 atomic % or less, about 0.1 atomic % or less, or about 0.05 atomic % or less, or in the range from about 0.05 atomic % to about 0.1 atomic %), the surface layer may be referred to as substantially alkali-free. Where the alkali concentration is less than about 0.05 atomic % or less, the surface layer may be referred to as alkali-free.

The alkali-containing bulk may include an alkali-metal oxide selected from $Li_2O$, $Na_2O$, $K_2O$, $Rb_2O$ and $Cs_2O$. The alkali-depleted surface layer of some embodiments may include $Al_2O_3$ in the range from about 1 mol % to about 50 mol %. The alkali-depleted surface layer optionally includes a binary $Al_2O_3$—$SiO_2$ composition.

In some embodiments, the alkali-depleted surface layer comprises less than about 0.1 atomic % hydrogen. The alkali-depleted surface layer may be substantially free of crystallites.

In some instances, the alkali-containing bulk and the alkali-depleted surface layer comprise $Al_2O_3$ and $SiO_2$, and the alkali-depleted surface layer comprises an atomic structure including aluminum substantially in a 4-coordinated state and optionally, may be substantially free of aluminum in a 5,6-coordinated state (e.g., less than 5% or less than 1% of all the aluminum is in a state other than a 4-coordinated state). In some embodiments, the atomic structure of the alkali-depleted surface layer comprises silicon in a 4-coordinated state.

The alkali-depleted surface layer may include a total amount of oxygen, wherein from about 3% to about 30% by fraction of the total amount of oxygen is in 3-coordinated state. In some embodiments, the alkali-depleted surface layer is substantially free of non-bridging oxygens. The alkali-containing bulk comprises non-bridging oxygens and bridging oxygens or may be substantially free of non-bridging oxygens.

A second aspect of this disclosure pertains to a glass substrate including a thickness t, an alkali-containing bulk having a bulk refractive index, and an alkali-depleted surface layer comprising at thickness in the range from about 10 nm to about 1000 nm and layer refractive index that is less than the bulk refractive index. In some instances, the thickness t is in the range from about 100 micrometers to 3000 micrometers.

A third aspect of this disclosure pertains to a method of forming a glass substrate with a modified surface layer. The method includes providing a glass substrate comprising a concentration of alkali, a glass transition temperature (Tg) and a surface layer, and reducing the concentration of alkali in the surface layer. The surface layer with reduced concentration of alkali comprises a substantially homogenous composition.

In some embodiments, reducing the concentration of alkali in the surface layer comprising contacting a surface of the glass substrate with an electrode, and subjecting the glass substrate to thermal poling. The electrode may include an anode in contact with an anodic surface of the glass substrate and a cathode in contact with the cathodic surface of the glass substrate. Thermal poling comprises applying voltage to the glass substrate such that the anode is positively-biased relative to the glass substrate to induce alkali depletion at the anodic surface of the glass. In some instances, the voltage comprises DC voltage or DC-biased AC voltage. The voltage in the range from about 100 volts to about 10,000 volts to the glass substrate for a duration in the range from about 1 minute to about 6 hours. Thermal poling may optionally include heating the glass substrate and electrode to a temperature below Tg prior to applying voltage to the glass substrate. Thermal poling may optionally include cooling the glass substrate and electrode from an elevated temperature to a target temperature below Tg prior to applying voltage to the glass substrate. In some embodiments, the glass substrate is subjected to thermal poling under vacuum, in an inert gas environment, or a permeable gas environment.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 2A is a ternary plot of glasses of Example I;

FIGS. 3A-3L are SIMS depth profiles for sodium on positively-biased surface of select thermally poled glasses of Example I;

FIG. 9 shows cross-sectional ELNES analysis at the Al L-edge, Si K-edge, and O K-edge for the alkali-depleted surface layer, in comparison with unpoled bulk beneath the poled layer.

FIG. 12B is a SIMS profile of the glass of FIG. 12A before etching;

DETAILED DESCRIPTION

Reference will now be made in detail to various embodiment(s).

Figure 1:
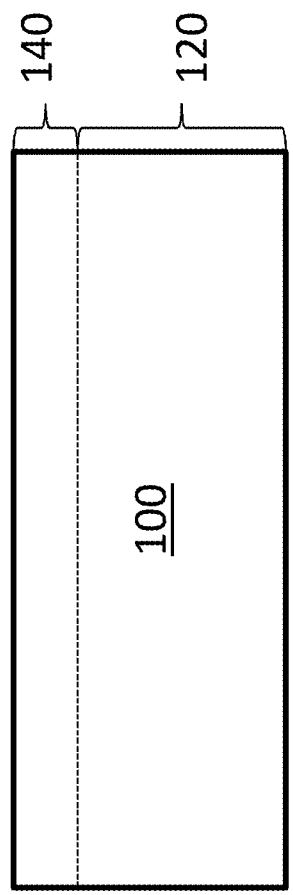
FIG. 1 is a side view of a glass substrate according to one or more embodiments.

As shown in FIG. 1, a first aspect of this disclosure pertains to a glass substrate 100 including an alkali-containing bulk 120 and an alkali-depleted surface layer 140. The alkali-containing bulk may include one or more alkali-metal oxides selected from $Li_2O$, $Na_2O$, $K_2O$, $Rb_2O$ and $Cs_2O$. In one or more embodiments, the alkali-depleted surface layer may be substantially alkali-free or alkali free. The alkali-depleted surface layer maybe described as an aluminosilicate surface layer, exhibiting a composition and atomic structure that differs from the bulk, while exhibiting homogeneity in terms of composition and/or atomic structure within and throughout the surface layer. The alkali-depleted surface layer is integral to the glass substrate and is not a coating or an addition to the bulk.

In one or more embodiments, the glass substrate may have a thickness t and alkali-depleted surface layer may have a thickness in the range from about 10 nm to about 1000 nm, from about 10 nm to about 900 nm, from about 10 nm to about 800 nm, from about 10 nm to about 700 nm, from about 10 nm to about 600 nm, from about 10 nm to about 500 nm, from about 50 nm to about 1000 nm, from about 100 nm to about 1000 nm, from about 200 nm to about 1000 nm, from about 250 nm to about 1000 nm, from about 300 nm to about 1000 nm, from about 400 nm to about 1000 nm, or from about 500 nm to about 1000 nm In some embodiments, thickness t may be in the range from about 0.1 mm to about 3.0 mm (e g , from about 0.3 mm to about 3 mm, from about 0.4 mm to about 3 mm, from about 0 5 mm to about 3 mm, from about 0.55 mm to about 3 mm, from about 0 7 mm to about 3 mm, from about 1 mm to about 3 mm, from about 0.1 mm to about 2 mm, from about 0.1 mm to about 1.5 mm, from about 0.1 mm to about 1 mm, from about 0.1 mm to about 0.7 mm, from about 0 1 mm to about 0.55 mm, from about 0.1 mm to about 0.5 mm, from about 0.1 mm to about 0.4 mm, from about 0.3 mm to about 0.7 mm, or from about 0.3 mm to about 0.55 mm).

In one or more embodiments, the alkali-depleted surface layer has substantially homogenous composition. In some embodiments, the composition of the alkali-depleted surface layer is substantially the same along the thickness of the surface layer. In other embodiments, the composition of the alkali-depleted surface layer is substantially the same along its entire volume. As used herein, the phrase "homogenous composition" refers to a composition that is not phase separated or does not include portions with a composition differing from other portions.

In one or more embodiments, the alkali-depleted surface layer may be substantially free of crystallites or is substantially amorphous. For example, in some embodiments, the alkali-depleted surface layer includes less than about 1 volume % crystallites.

In one or more embodiments, the alkali-depleted surface layer is substantially free of hydrogen. Such hydrogen may be present in the form of $H^+$, $H_3O^+$, $H_2O$ or combinations therefrom. In some embodiments, the alkali-depleted surface layer includes about 0.1 atomic % hydrogen or less (e.g., about 0.08 atomic % hydrogen or less, about 0.06 atomic % hydrogen or less, about 0.05 atomic % hydrogen or less, about 0.04 atomic % hydrogen or less, about 0.02 atomic % hydrogen or less, or about 0.01 atomic % hydrogen or less). Without being bound by theory, the absence of hydrogen indicates that as alkali is depleted from the alkali-depleted surface layer of the glass substrate, the atomic structure of the alkali-depleted surface layer adapts to charge compensate 4-coordinated aluminum by forming oxygen triclusters and hydrogen is not present as an alternate means of charge compensation. In contrast, glass substrates that are treated by leaching or other wet chemical treatments typically have surface layers that include hydrogen. Accordingly, in one or more embodiments the alkali-containing bulk and the alkali-depleted surface layer comprise $Al_2O_3$ and $SiO_2$, but the alkali-depleted surface layer has an atomic structure comprising aluminum in a 4-coordinated state. For example, about 50% to about 100% by fraction (e.g., from about 60% to about 100%, from about 70% to about 100%, from about 80% to about 100%, from about 50% to about 95%, from about 50% to about 90%, from about 50% to about 80% or from about 50% to about 70%) of the aluminum in the alkali-depleted surface is in a 4-coordinated state. The alkali-depleted surface layer of some embodiments less than about 50% alumina by fraction that is in a 5,6-coordinated state. In some embodiments, the alkali-depleted surface layer is substantially free of aluminum in a 5,6-coordinated state.

In some embodiments, the atomic structure of the alkali-depleted surface layer includes silicon in a 4-coordinated state, but may optionally include silicon in other states.

As previously mentioned, the alkali-depleted surface layer may include oxygen in a formation that promotes the formation of aluminum in a 4-coordinated state. In some embodiments, from about 3% to about 30% by fraction (e.g., from about 3% to about 20%, from about 3% to about 15%, or from about 3% to about 10%) of the oxygen present in the alkali-depleted surface is in a 3-coordinated state. In some instances, the alkali-depleted surface layer is substantially free of non-bridging oxygens, while, in some embodiments, the alkali-containing bulk comprises non-bridging oxygens and bridging oxygens. An alkali-depleted surface layer may also be present or formed when the alkali-containing bulk is substantially free of non-bridging oxygens. In some such embodiments, the alkali-containing bulk may include an amount of $Na_2O$ that is about equal to the amount of $Al_2O_3$ present in the bulk.

In some embodiments, the alkali-depleted surface layer comprises $Al_2O_3$ in the range from about 1 mol % to about 50 mol %. In some embodiments, the amount of $Al_2O_3$ may be in the range from about 1 mol % to about 45 mol %, from about 1 mol % to about 40 mol %, from about 1 mol % to about 30 mol %, from about 1 mol % to about 25 mol %, from about 5 mol % to about 50 mol %, from about 10 mol % to about 50 mol %, from about 20 mol % to about 50 mol %, from about 30 mol % to about 50 mol %, from about 1 mol % to about 45 mol %, 5 mol % to about 35 mol %, or from about 3 mol % to about 34 mol %.

In one or more specific embodiments, the alkali-depleted surface layer comprises a binary $Al_2O_3$—$SiO_2$ composition, though other non-alkali components may be included.

The glass substrate, prior to thermal poling treatment, as will be described herein, and the alkali-containing bulk may include a variety of glass compositions. Such glass compositions used in the glass substrate prior to thermal poling treatment and present in the alkali-containing bulk after thermal poling treatment may be referred to herein as a "precursor" glass or glass composition. The precursor compositions may range from simple alkali or alkaline-earth silicates, aluminosilicates, borosilicates, or boroaluminosilicates, to more complex multicomponent glasses able to form an altered surface layer by the process of thermal poling. In one embodiment, the alkali-containing bulk may show signs of nanoscale phase-separation but, when these glasses were subjected to thermal poling, the layers included a single-phase.

One example precursor glass composition comprises $SiO_2$, $B_2O_3$ and $Na_2O$, where $(SiO_2+B_2O_3) \geq 66$ mol. %, and $Na_2O \geq 9$ mol. %. In an embodiment, the precursor glass composition includes at least 6 wt. % aluminum oxide. In a further embodiment, the precursor glass composition includes with one or more alkaline earth oxides, such that a content of alkaline earth oxides is at least 5 wt. %. Suitable precursor glass compositions, in some embodiments, further comprise at least one of $K_2O$, MgO, and CaO. In a particular embodiment, the precursor glass compositions can comprise 61-75 mol. % SiO2; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example precursor glass composition comprises: 60-70 mol. % SiO2; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $\leq$ (MgO+CaO) $\leq 10$ mol. %.

A still further example precursor glass composition comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. %≤($Li_2O+Na_2O+K_2O$)≤18 mol. % and 2 mol. %≤(MgO+CaO)≤7 mol. %.

In a particular embodiment, the precursor glass composition comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio ($Al_2O_3+B_2O_3$)/πmodifiers (i.e., sum of modifiers) is greater than 1, where in the ratio the components are expressed in mol. % and the modifiers are alkali metal oxides. This precursor glass composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio ($Al_2O_3+B_2O_3$)/Σmodifiers (i.e., sum of modifiers) is greater than 1.

In still another embodiment, the precursor glass composition comprises: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. %≤$SiO_2+B_2O_3$+CaO≤69 mol. %; $Na_2O+K_2O+B_2O_3$+MgO+CaO+SrO>10 mol. %; 5 mol. %≤MgO+CaO+SrO≤8 mol. %; ($Na_2O+B_2O_3$)—$Al_2O_3$≤2 mol. %; 2 mol. %≤$Na_2O$—$Al_2O_3$≤6 mol. %; and 4 mol. %≤($Na_2O+K_2O$)—$Al_2O_3$≤10 mol. %.

In an alternative embodiment, the precursor glass composition comprises: 2 mol % or more of $Al_2O_3$ and/or $ZrO_2$, or 4 mol % or more of $Al_2O_3$ and/or $ZrO_2$. Fining agents may be included in the precursor glass compositions described herein such as SnO2 and other known fining agents.

In one or more embodiments, the precursor glass composition may be substantially free of boron. For example, the precursor glass composition and/or the glass substrate after thermal poling treatment may include less than about 1 mol %, or less than about 0.1 mol % $B_2O_3$ or boron in any state.

In one or more embodiments, the glass substrate after thermal poling treatment exhibits a refractive index in the range from about 1.45 to about 1.55, with the alkali-depleted surface layer exhibiting a lower refractive index than the alkali-containing bulk. In specific embodiments, the glass substrate may exhibit an average strain-to-failure at a surface on one or more opposing major surface that is 0.5% or greater, 0.6% or greater, 0.7% or greater, 0.8% or greater, 0.9% or greater, 1% or greater, 1.1% or greater, 1.2% or greater, 1.3% or greater, 1.4% or greater 1.5% or greater or even 2% or greater, as measured using ball-on-ring testing using at least 5, at least 10, at least 15, or at least 20 samples. In specific embodiments, the glass substrate may exhibit an average strain-to-failure at its surface on one or more opposing major surface of about 1.2%, about 1.4%, about 1.6%, about 1.8%, about 2.2%, about 2.4%, about 2.6%, about 2.8%, or about 3% or greater.

After thermal poling treatment, the glass substrates described herein may exhibit an elastic modulus (or Young's modulus) in the range from about 30 GPa to about 120 GPa. In some instances, the elastic modulus of the substrate may be in the range from about 30 GPa to about 110 GPa, from about 30 GPa to about 100 GPa, from about 30 GPa to about 90 GPa, from about 30 GPa to about 80 GPa, from about 30 GPa to about 70 GPa, from about 40 GPa to about 120 GPa, from about 50 GPa to about 120 GPa, from about 60 GPa to about 120 GPa, from about 70 GPa to about 120 GPa, and all ranges and sub-ranges therebetween.

In one or more embodiments, the glass substrate may be strengthened or non-strengthened. In some embodiments, the thermal poling may be performed on strengthened glass substrates such that the alkali-depleted surface layer is formed on top of a compressive stress layer in the strengthened glass substrate.

The glass substrate may be substantially planar or sheet-like, although other embodiments may utilize a curved or otherwise shaped or sculpted substrate. The glass substrate may be substantially optically clear, transparent and free from light scattering. In such embodiments, the glass substrate may exhibit an average total transmittance over the optical wavelength regime of about 85% or greater, about 86% or greater, about 87% or greater, about 88% or greater, about 89% or greater, about 90% or greater, about 91% or greater or about 92% or greater.

Additionally or alternatively, the physical thickness of the glass substrate may vary along one or more of its dimensions for aesthetic and/or functional reasons. For example, the edges of the glass substrate may be thicker as compared to more central regions of the glass substrate. The length, width and physical thickness dimensions of the glass substrate may also vary according to the application or use.

The glass substrate may be provided using various forming methods can include float glass processes and down-draw processes such as fusion draw and slot draw.

The resulting glass substrates including the alkali-containing bulk and alkali-depleted surface layer described herein exhibit improved corrosion resistance, improved diffusion barrier properties, higher hardness and/or elastic-modulus values, greater fatigue resistance, and/or improved damage resistance (via so-called anomalous deformation).

Based on Al and Si in 4-coordinated state and absence of non-bridging oxygen in favor of oxygen in a 3-coordinated state, the glass network has a near-maximal degree of connectivity, which favors high hardness and/or modulus. The absence of mobile alkali or other network-modifiers means there are very limited pathways for ionic hopping conduction, translating to inhibited diffusion (aka diffusion barrier) properties. Likewise, the absence of mobile alkali or other network-modifiers will increase resistance to corrosion in chemistries that operate primarily by an ion-exchange mechanism (e.g. $H^+/H_3O^+$⇌$Na^+$), a prime example being acidic chemistries. Even in chemistries that do not operate primarily by an ion-exchange mechanism, the absence of non-bridging oxygen and high network connectivity is expected to lead to reduced network dissolution, for example in neutral of alkaline-pH chemistries (consider silica dissolution rates versus other multicomponent glasses in basic-pH). To those knowledgeable in the art, fatigue resistance and crack initiation are substantially worse in alkali-containing glasses as compared to materials like silica, and thus the alkali-depleted surface layer thus would be expected to show a lower fatigue parameter and high crack initiation threshold. Lastly, the indentation behavior has been structurally linked in glasses to well-connected networks that have a substantial amount of free volume. As the layers described in this disclosure are formed well below Tg, they are expected to be far from the melt-equilibrium structure one might otherwise obtain by melting, and thus likely contain substantial free volume, translating to expectation of anomalous deformation behavior and so-called native damage resistance.

In one or more embodiments, the alkali-depleted surface layer comprises a layer refractive index that is less than the refractive index of the alkali-containing bulk. For example, the alkali-containing layer may have a refractive index that is in the range from about 1.4 to about 1.5 at a wavelength of about 550 nm. Such embodiments can exhibit an antireflection effect due to the lower refractive index alkali-containing layer.

In some embodiments, the glass substrate having an alkali-containing bulk and an alkali-depleted surface layer may exhibit increased elastic modulus as compared to the alkali-containing bulk (or the glass substrate before the alkali-depleted surface layer is formed). For example, the glass substrate may have an elastic modulus that is about 10% greater than the elastic modulus of the alkali-containing bulk (or the glass substrate before the alkali-depleted surface layer is formed). For example, where the alkali-containing bulk (or the glass substrate before the alkali-depleted surface layer is formed) exhibits an elastic modulus of about 80 GPa, the glass substrate exhibits an elastic modulus of about 90 GPa. In some embodiments, the hardness of the glass substrates described herein is also greater than the hardness of the alkali-containing bulk. For example, the hardness of the glass substrate may be about 10% or even 20% greater than the hardness of the alkali-containing bulk (or the glass substrate before the alkali-depleted surface layer is formed). In one example, the hardness of the alkali-containing bulk (or the glass substrate before the alkali-depleted surface layer is formed) may be about 6 GPa, while the glass substrate exhibits a hardness of about 7 GPa, at indentation depths from about 0 nm to about 200 nm. Unless otherwise specified, the hardness values described herein refer to Vickers hardness.

In some embodiments, the alkali-depleted surface layers also block ion diffusion either into the glass substrate or from the alkali-containing bulk to the alkali-depleted surface layer.

The glass substrates described herein may exhibit an increased chemical durability in terms of resistance to dissolution in acid, water or base. In some examples, the glass substrate exhibits a decrease in dissolution rates in acid, water or base of about 1.5 times or more or even about 10 times or more.

A second aspect of this disclosure pertains to a method of forming a glass substrate with a modified surface layer. The method includes providing a glass substrate comprising a concentration of alkali and a surface layer, and reducing the concentration of alkali in the surface layer. In one or more embodiments, the resulting surface layer with reduced concentration of alkali comprises a substantially homogenous composition.

In one or more embodiments, reducing the concentration of alkali in the surface layer includes contacting a surface of the glass substrate with an electrode, and subjecting the glass substrate to thermal poling.

Prior to thermal poling treatment, the surface of the glass substrate (and thus the surface layer) may cleaned or treated to remove typical contamination that may accumulate after forming, storage and shipping. Alternatively, the glass substrate may be subjected to treatment immediately after forming to eliminate the accumulation of contamination.

The electrode used in thermal poling may include an anode in contact with an anodic surface of the glass substrate and a cathode in contact with the cathodic surface of the glass substrate. The anodic surface is subjected to positive DC bias while the cathodic surface is subject to negative DC bias.

In one or more embodiments, the electrode material is substantially more conductive than the glass at the poling temperature to provide for field uniformity over the modified surface area. It is also desirable that the anodic electrode material be relatively oxidation resistant to minimize the formation of an interfacial oxide compound that could cause sticking of the glass to the template. Exemplary anodic electrode materials include noble metals (e.g., Au, Pt, Pd, etc.) or oxidation-resistant, conductive films (e.g. TiN, TiAlN).

The cathodic electrode material may also be conductive to likewise provide for field uniformity over the modified area. Exemplary materials for the cathodic electrode material include materials that can accept alkali ions from the glass, such as graphite. In some embodiments, a physical cathodic electrode may not always be necessary to be brought into contact, due to surface discharge.

In one or more embodiments, the electrode(s) are separate components that are brought into contact with the glass, and thus can be separated after processing without complex removal steps. Electrodes can generally comprise a bulk material, or take the form of a thin film, for example, a conductive thin film that is deposited on the glass to serve as an electrode.

In some embodiments, the electrode can generally cover all or only part of the surface, and may be intermittent or patterned as desired. Patterning can be achieved by any of a variety of methods, such as lithographic techniques, mechanical machining, or otherwise.

The curvature and/or flatness of the glass and the electrode should be ideally matched to provide for reasonably intimate contact at the interface over the affected area. However, even if initial contact is not intimate, the electrostatic charge at the interface when voltage is applied will tend to pull the two surfaces into intimate contact as an inherent part of the method.

Thermal poling may include applying voltage to the glass substrate such that the anode is positively-biased relative to the glass substrate to induce alkali depletion at the anodic surface of the glass. The voltage may be DC voltage or DC-biased AC voltage. Prior to applying the voltage, the method may include heating the glass substrate and electrode (i.e., the stack including an anode/glass/cathode) to a temperature below Tg prior to applying voltage to the glass substrate. In some embodiments, the glass substrate and electrode may be heated to a process temperature in the range from about 25° C. to about Tg, or from about 100° C. to about 300° C. In some embodiments, equilibrium at the desired process temperature may be useful in thermal poling to ensure temperature uniformity.

In one or more embodiments, the thermal poling treatment includes applying voltage in the range from about 100 volts to about 10,000 volts (e.g., from about 100 volts to about 1000 volts) to the glass substrate for a duration in the range from about 1 minute to about 6 hours (e.g., from about 5 minutes to about 60 minutes, from about 15 minutes to about 30 minutes). It should be noted that thermal poling treatment times and voltages may vary depending on glass composition. In some embodiments, the glass substrate is subjected to thermal poling under vacuum, in an inert gas environment (e.g., dry $N_2$), or a permeable gas environment (e.g., He).

Voltage may be applied in either one or more discrete steps to achieve a maximum desired value, or ramped (or increased) in a controlled/current-limited manner up to the process voltage. Various approaches have the advantage of potentially circumventing thermal dielectric breakdown with the passage of too much current through the glass, especially with low-resistivity glasses, allowing for higher final poling voltages and possibly thicker surface layers. Alternatively, as breakdown strength varies with glass composition, surface condition, and ambient temperature, an "instant-on" strategy for applying voltage may also be tolerated under some conditions, and could be desired for convenience.

After thermal poling treatment, the glass substrate may be cooled to a temperature in the range from about 25° C. to about 80° C. for subsequent handling. The voltage may be removed prior to cooling or after cooling.

In one or more embodiments, apparatus suitable for performing poling treatments can include any system that can simultaneously maintain heat and voltage to the glass/electrode stack in a controlled manner while avoiding practical problems such as leakage current paths or arcing. In one or more embodiments, the apparatus also provides control of the process atmosphere (e.g., under vacuum, in an inert gas environment such as dry $N_2$, or permeable gas environment) can minimize atmosphere effects and/or occluded gas at the interface.

EXAMPLES

Various embodiments will be further clarified by the following examples.

A series of sodium aluminosilicate glasses were melted, and the compositions verified by ICP-OES. Bulk composition results are given in Table 1, in both mol % and weight %, as measured by inductively coupled plasma optical emission spectrometry (ICP-OES).

TABLE 1

Bulk composition information for Examples 1-18.

| | Mol % | | | Wt % | | |
|---|---|---|---|---|---|---|
| Ex. | $SiO_2$ | $Al_2O_3$ | $Na_2O$ | $SiO_2$ | $Al_2O_3$ | $Na_2O$ |
| 1 | 59.7 | 16.1 | 24.1 | 52.8 | 24.2 | 22 |
| 2 | 60.5 | 13.2 | 26.2 | 54.8 | 20.3 | 24.5 |
| 3 | 60.6 | 10.6 | 28.8 | 55.4 | 16.4 | 27.2 |
| 4 | 69.7 | 12.8 | 17.5 | 63.3 | 19.7 | 16.4 |
| 5 | 70.2 | 9.8 | 20.0 | 65.1 | 15.4 | 19.1 |
| 6 | 70.8 | 7.3 | 21.9 | 67.4 | 11.8 | 21.5 |
| 7 | 50.1 | 25.5 | 24.3 | 42.4 | 36.6 | 21.2 |
| 8 | 60.3 | 20.1 | 19.5 | 52.4 | 29.7 | 17.5 |
| 9 | 65.2 | 17.7 | 17.1 | 57.7 | 26.5 | 15.6 |
| 10 | 70.3 | 15.1 | 14.6 | 62.8 | 22.8 | 13.4 |
| 11 | 56.8 | 18.0 | 25.1 | 50.2 | 27 | 22.9 |
| 12 | 56.4 | 11.8 | 31.8 | 51.4 | 18.3 | 29.9 |
| 13 | 71.5 | 3.4 | 25 | 68.7 | 5.6 | 24.8 |
| 14 | 72.4 | 0.1 | 27.5 | 71.3 | 0.2 | 27.9 |
| 15 | 75.9 | 12.7 | 11.3 | 69.6 | 19.8 | 10.7 |
| 16 | 70.6 | 15.2 | 14.1 | 63.1 | 23.1 | 13 |
| 17 | 68.2 | 17.9 | 13.9 | 59.9 | 26.7 | 12.6 |
| 18 | 63.7 | 20.8 | 15.4 | 55.7 | 30.9 | 13.9 |

Figure 2B:
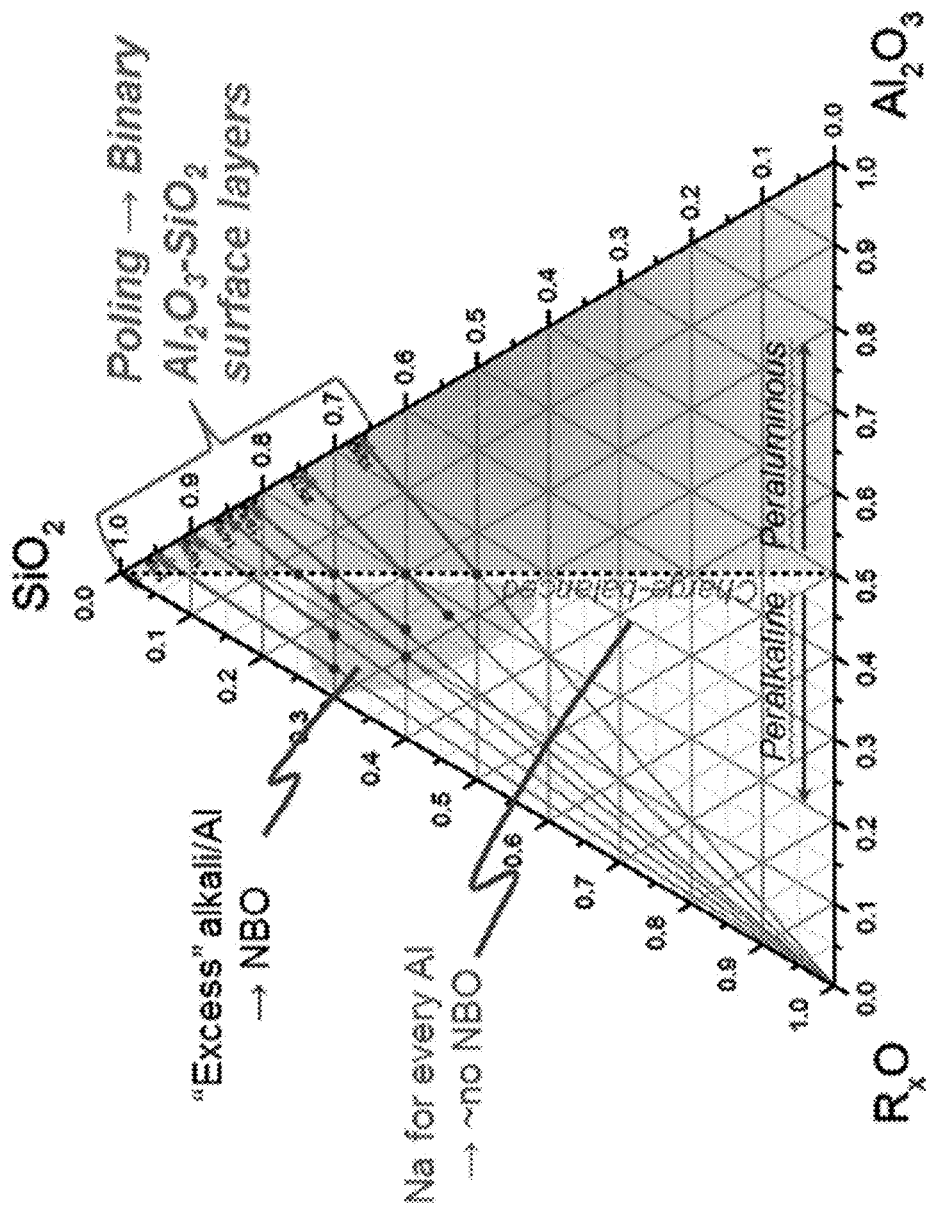
FIG. 2B is a ternary diagram highlighting difference in initial glass structure and the glass structure after thermal poling.
Figure 3A:
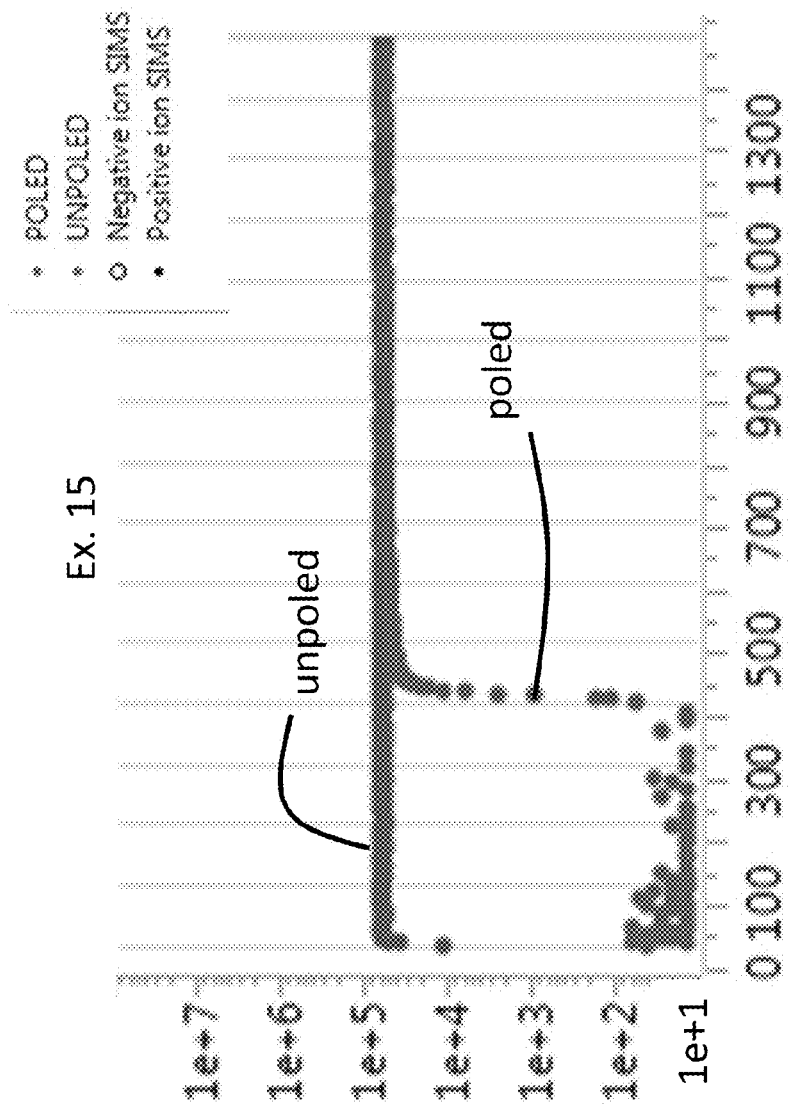
Figure 3B:
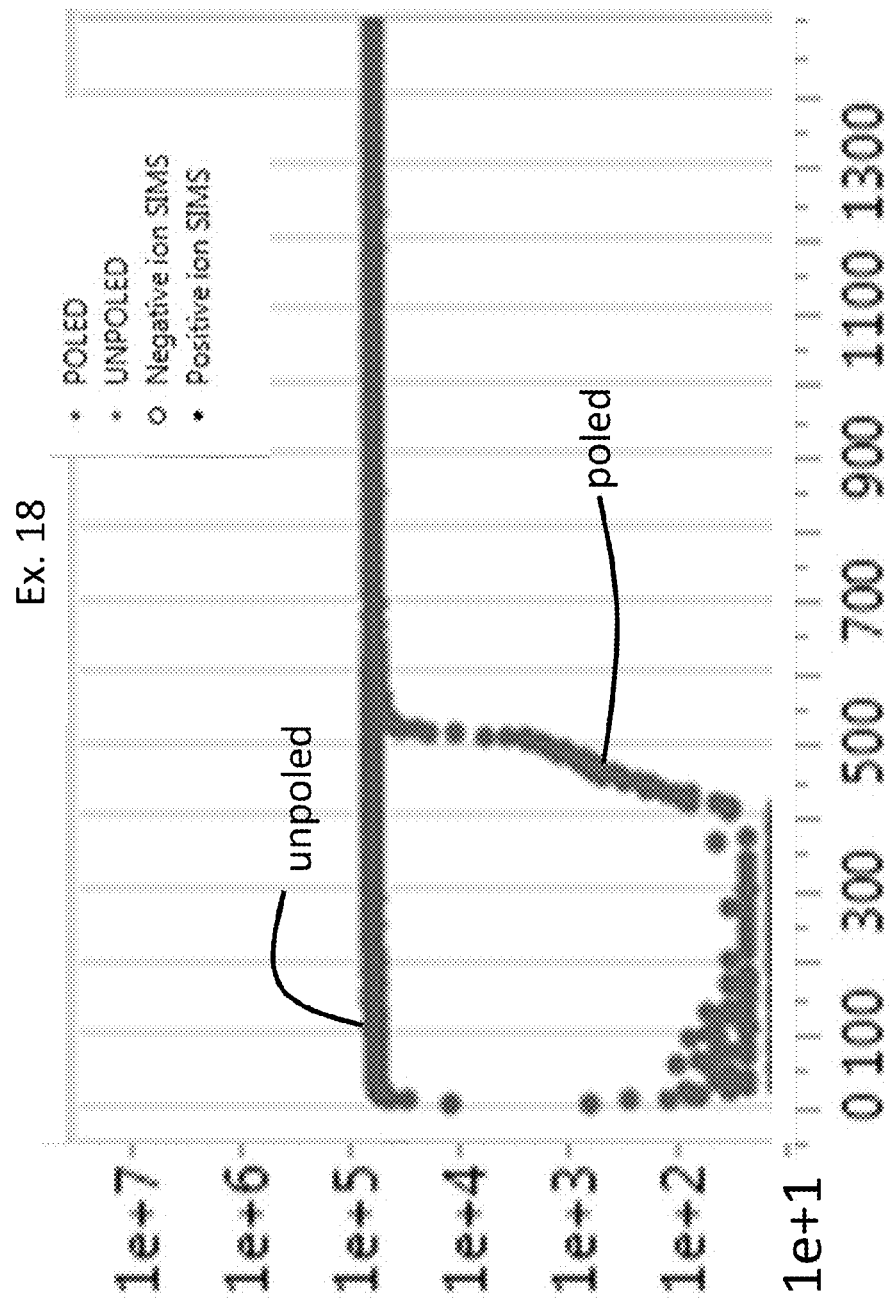
Figure 3E:
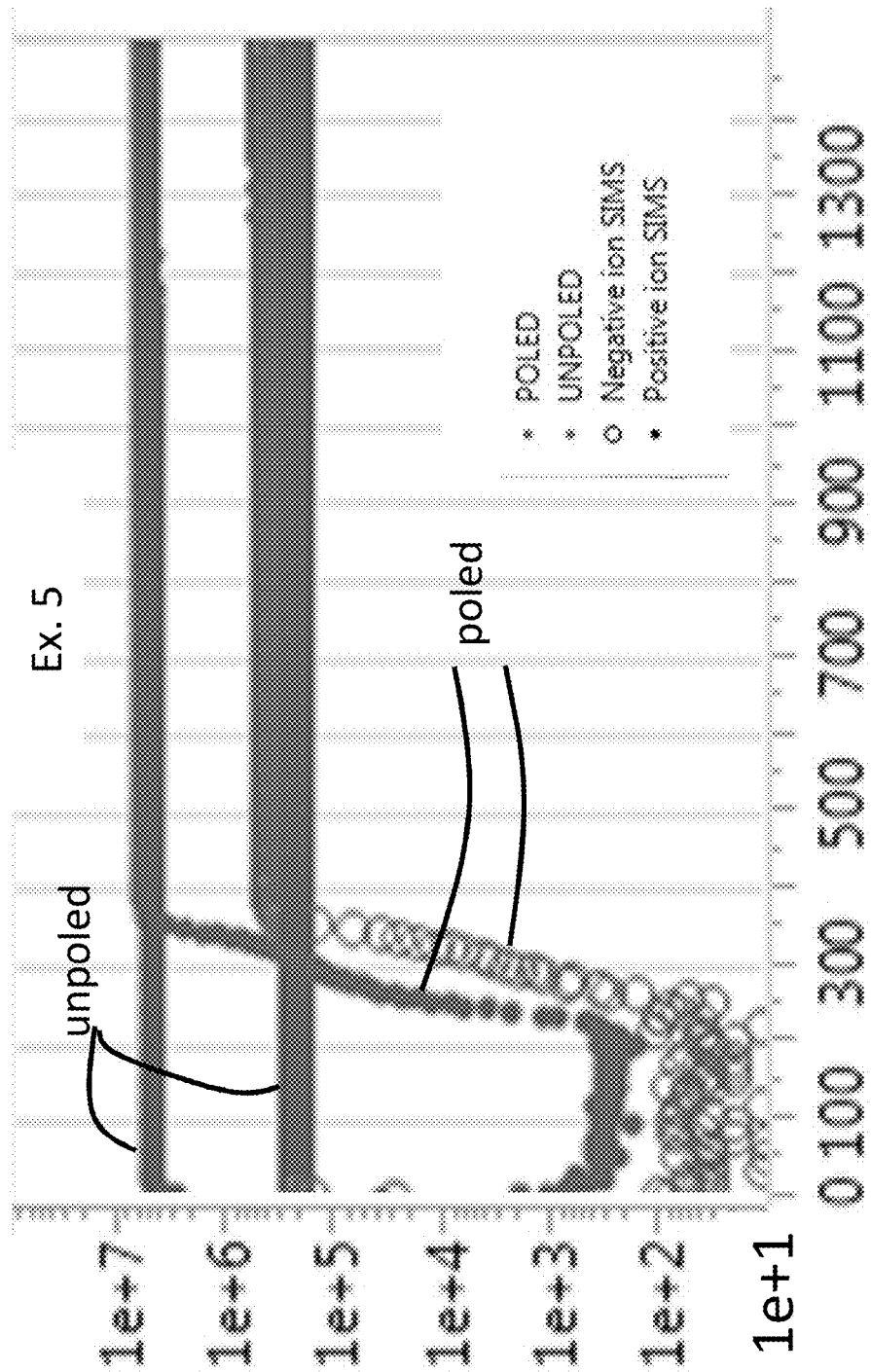
Figure 3F:
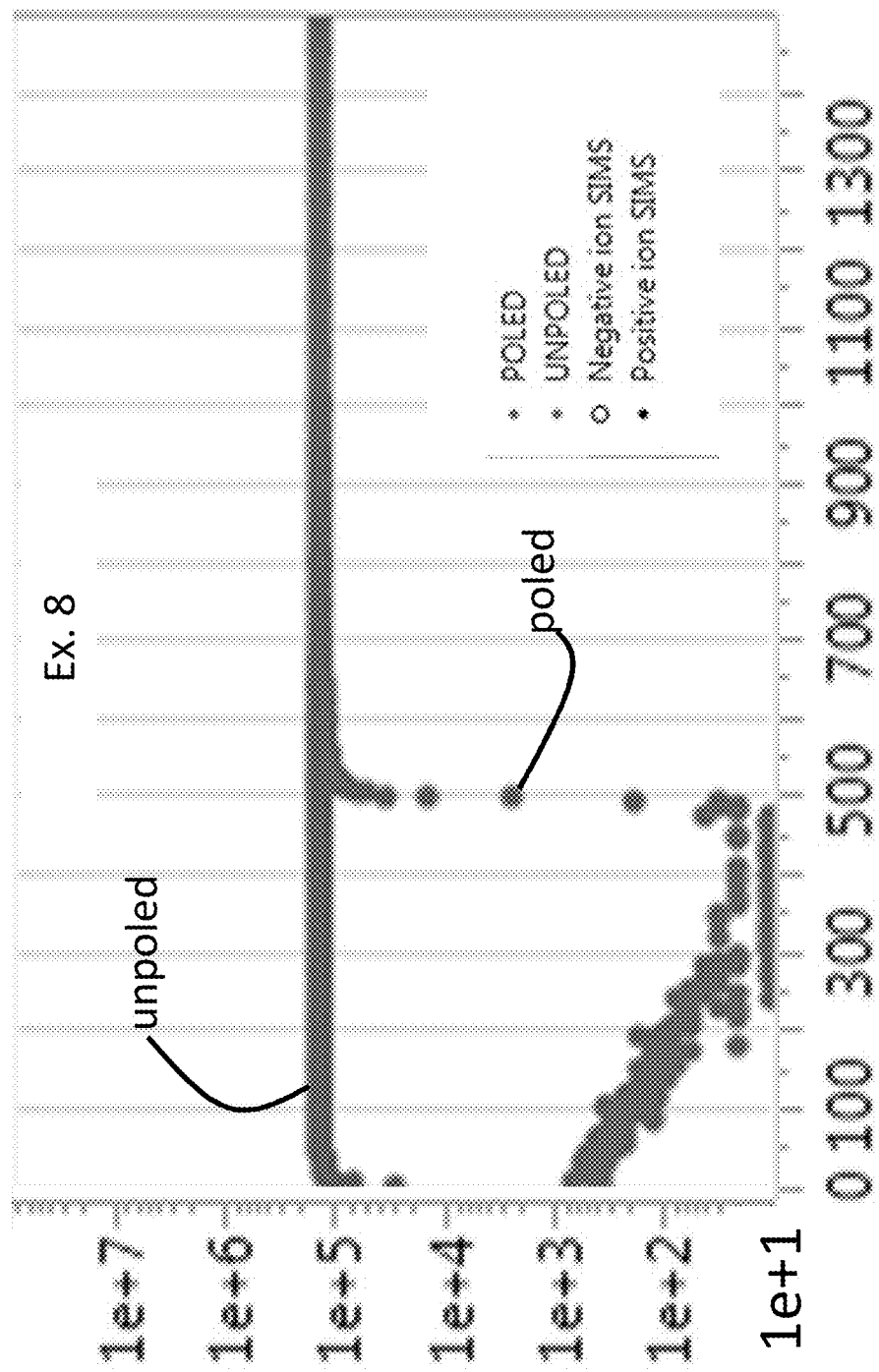
Figure 3G:
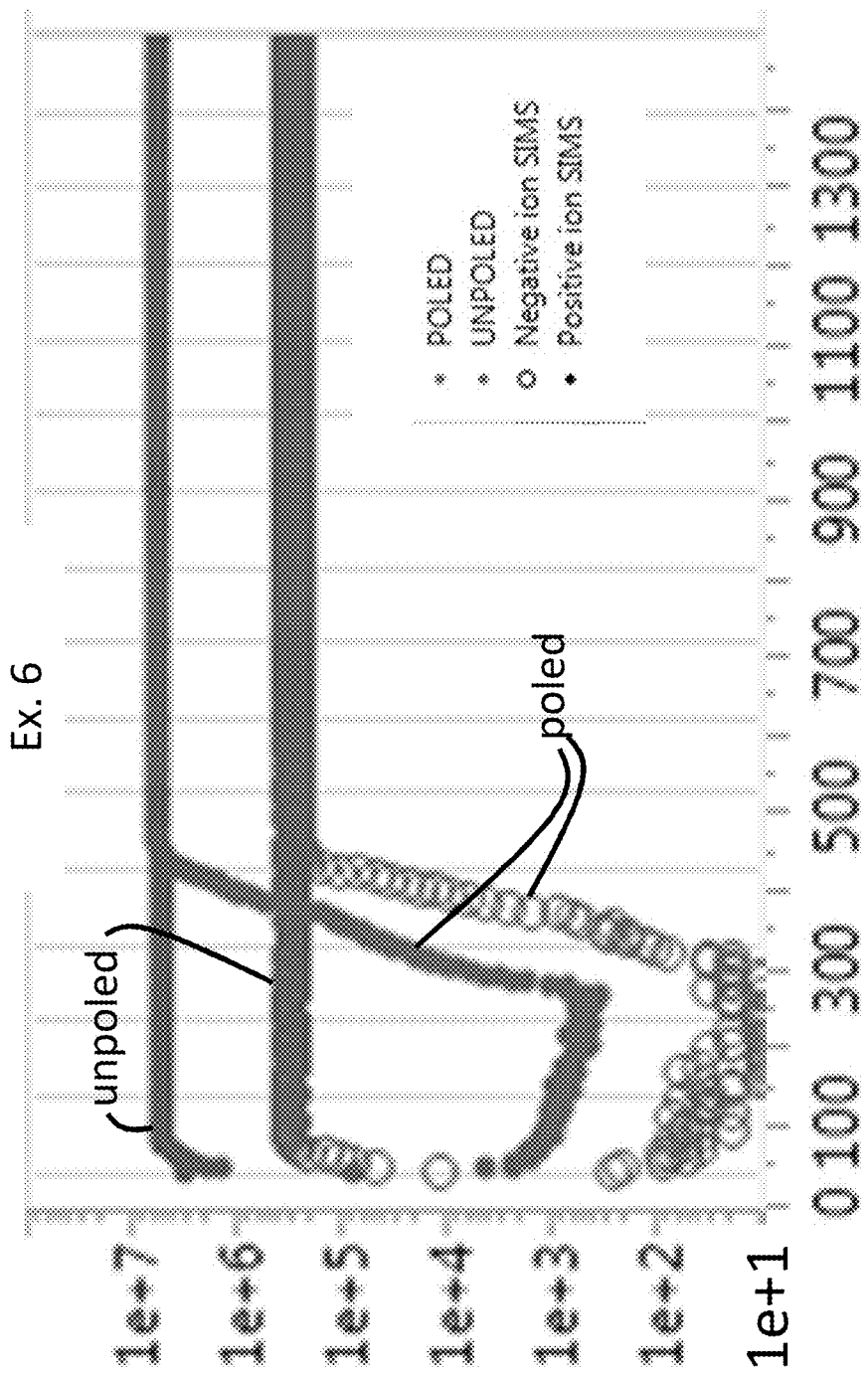
Figure 31:
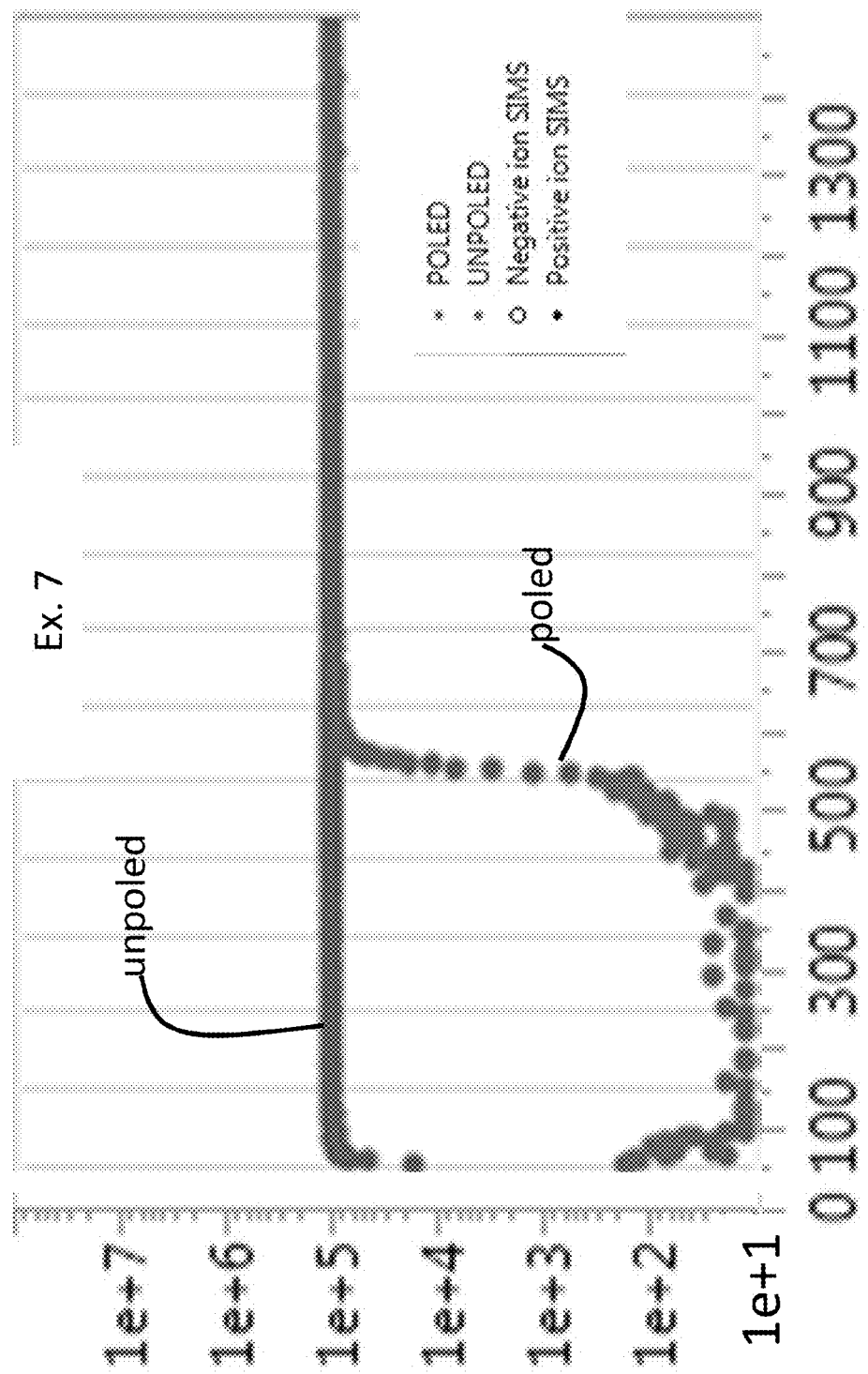
Figure 3J:
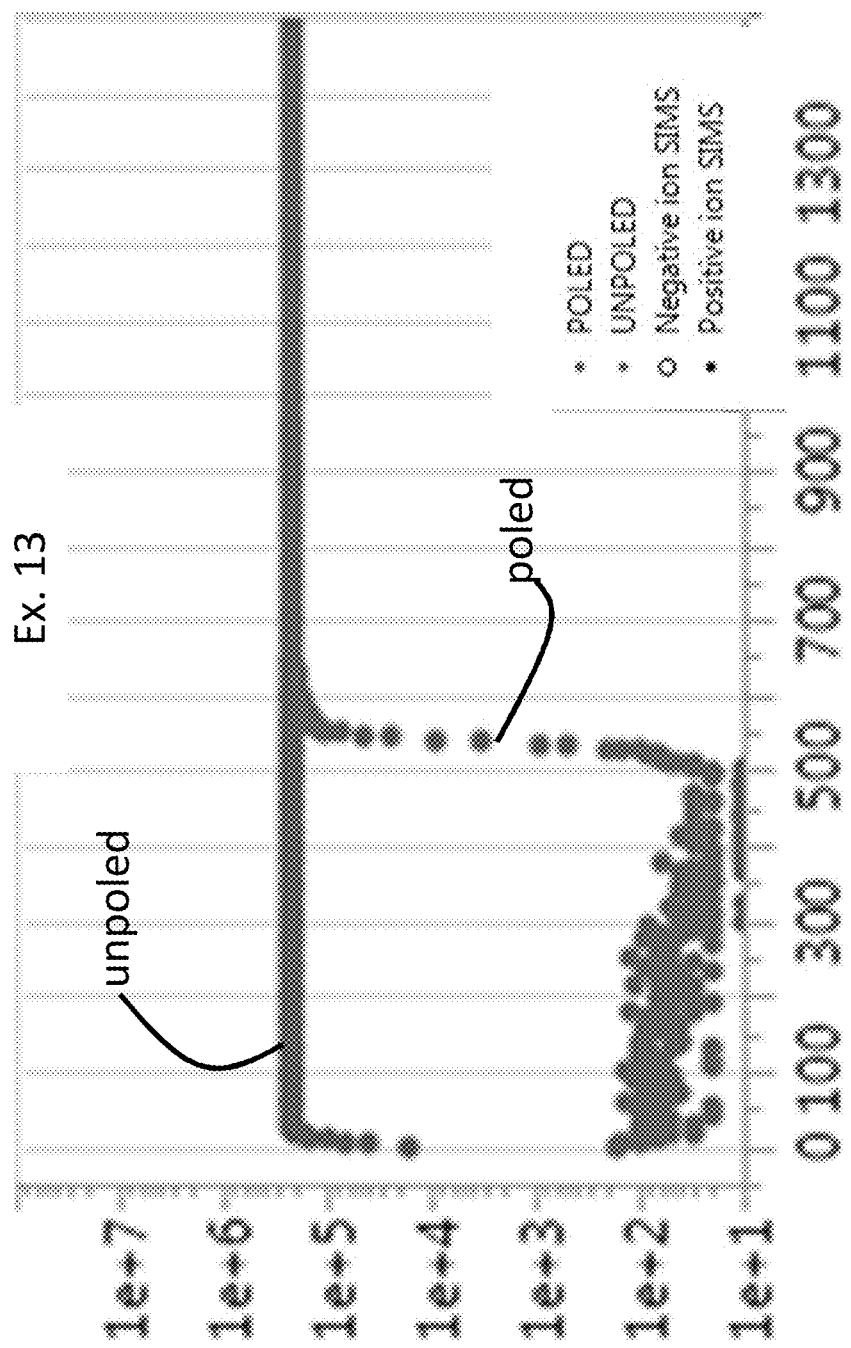
Figure 3L:
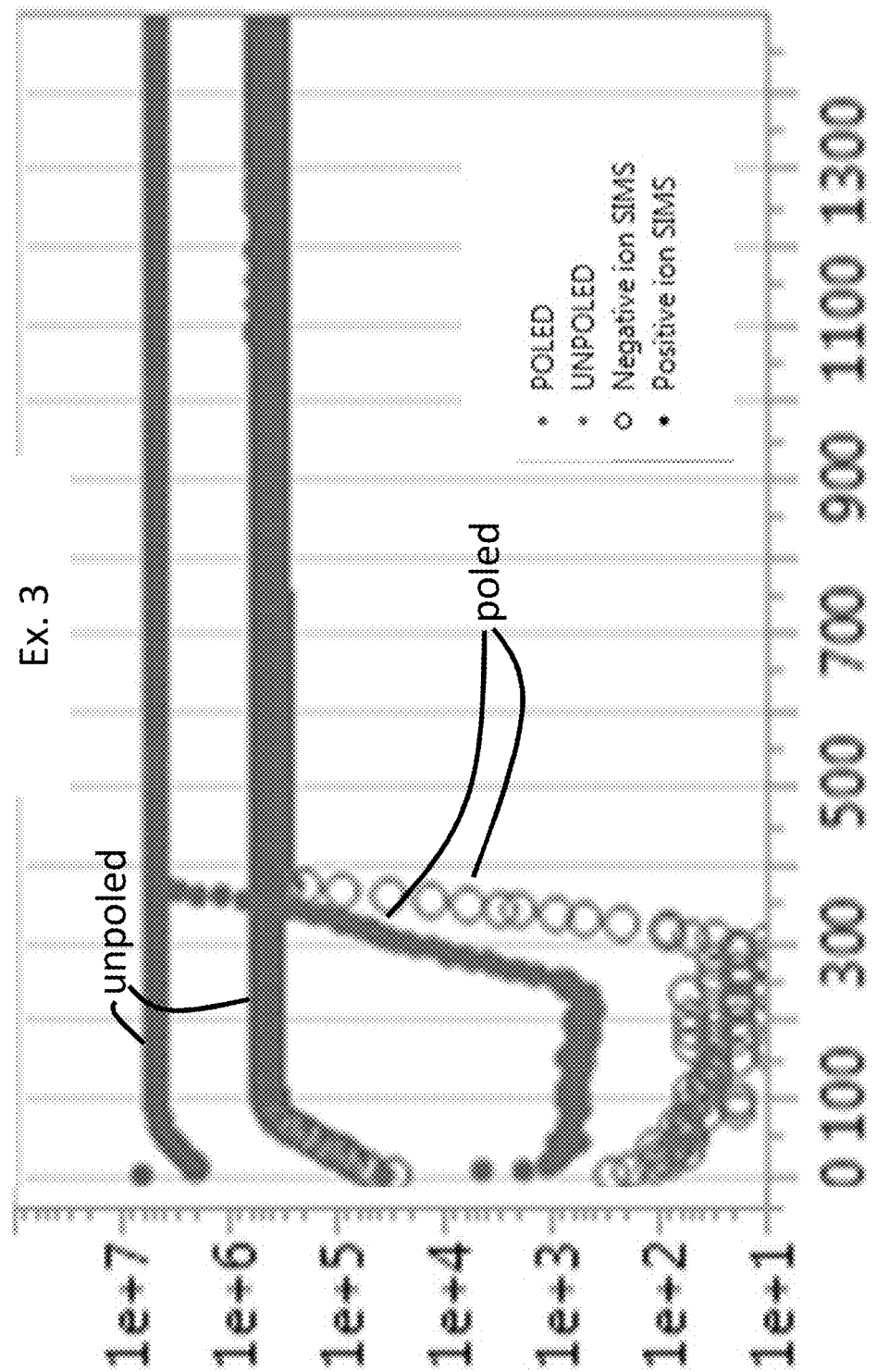

A ternary diagram summarizing the precursor glass compositions and the corresponding experimental strategy is shown in FIG. 2A. Model glasses in the $Na_2O$—$Al_2O_3$—$SiO_2$ system represent "precursor" or bulk glass compositions, upon which depleted surface layers were synthesized by thermal poling on the positively-biased surface of the glass. After thermal poling, the corresponding compositional effect is to create an alkali-depleted surface layer, wherein the modifier species is driven out of the surface layer. The network-former-only compositions that were generated in the alkali-depleted surface layer are projected onto the $Al_2O_3$—$SiO_2$ binary edge of the diagram, as shown in FIG. 2B. Unless specified herein, the bulk glass or the alkali-containing bulk glass has the same composition, structure and features as the precursor glass before being subjected to thermal poling.

Use of simple ternary compositions as shown in Table 1 allows for more definitive determination of structure, while still maintaining relevance with commercial and other useful compositions. In addition, the compositions were also selected to provide examples where alkali-depleted surface layers are synthesized with overlapping final compositions with one another, but formed from precursor glasses of different initial compositions and structure from one another (i.e., to demonstrate that alkali-depleted surface layers having the same compositions can be formed from various different precursor glasses). In this way, the role of precursor glass composition could also be probed, with varied concentrations and types of alkali-charge-balanced species in the structure (e.g. non-bridging oxygen vs. tetrahedral aluminum).

Glass sheets were formed from the precursor glass compositions shown in Table 1 and polished into planar coupons having dimensions from about 25 square millimeters to about 50 square millimeters. The coupons have a thickness of about 1.0 millimeter.

For poling, a bulk high-purity platinum (Pt) monolith was obtained and polished to an optical finish. This element was placed in contact with the surface of each glass sheet for use as the positively-biased electrode. On the cathode side of each glass sheet, a section of graphite foil (e.g., graphite foil supplied by Graftech International, under the trademark Grafoil®) was used. The electrode sizes were controlled such that they did not cover the entire surface of the glass on either side, to reduce or eliminate leakage currents.

After loosely stacking the electrodes and glass sheet, each such stack was introduced in a dry nitrogen atmosphere was created and heated to a temperature between about 200° C. and 300° C. After equilibrating at a temperature in this rage for about 15 minutes, a voltage of about +300V was applied to the platinum electrode, with current limited to 1 mA maximum. An initial increase in current was observed, followed by a slow decay as the alkali-depleted surface layer formed. The voltage was applied for a period of about 15 minutes, after which the heater was shut off and the stack of electrodes and glass sheet was allowed to cool under voltage. When the temperature of the stack was less than about 100° C., the voltage was removed, the chamber was vented, and the stack was manually separated.

The glass sheet after thermal poling was compared to the same glass sheet that was unpoled or did not undergo thermal poling for various forms of analysis.

Figure 4:
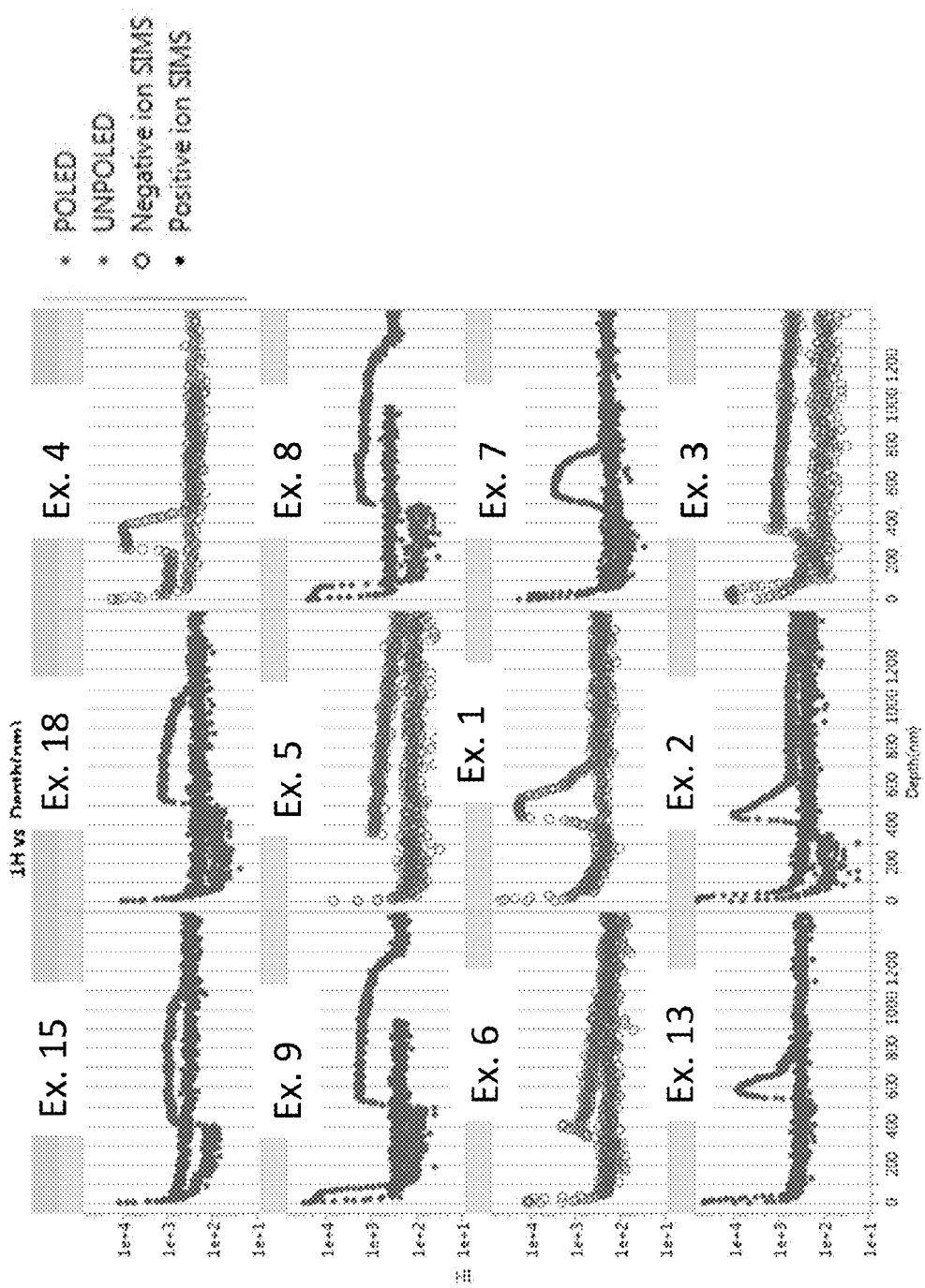
FIG. 4 shows SIMS depth profiles for hydrogen on positively-biased surface of select thermally poled glasses of Example I.
Figure 5:
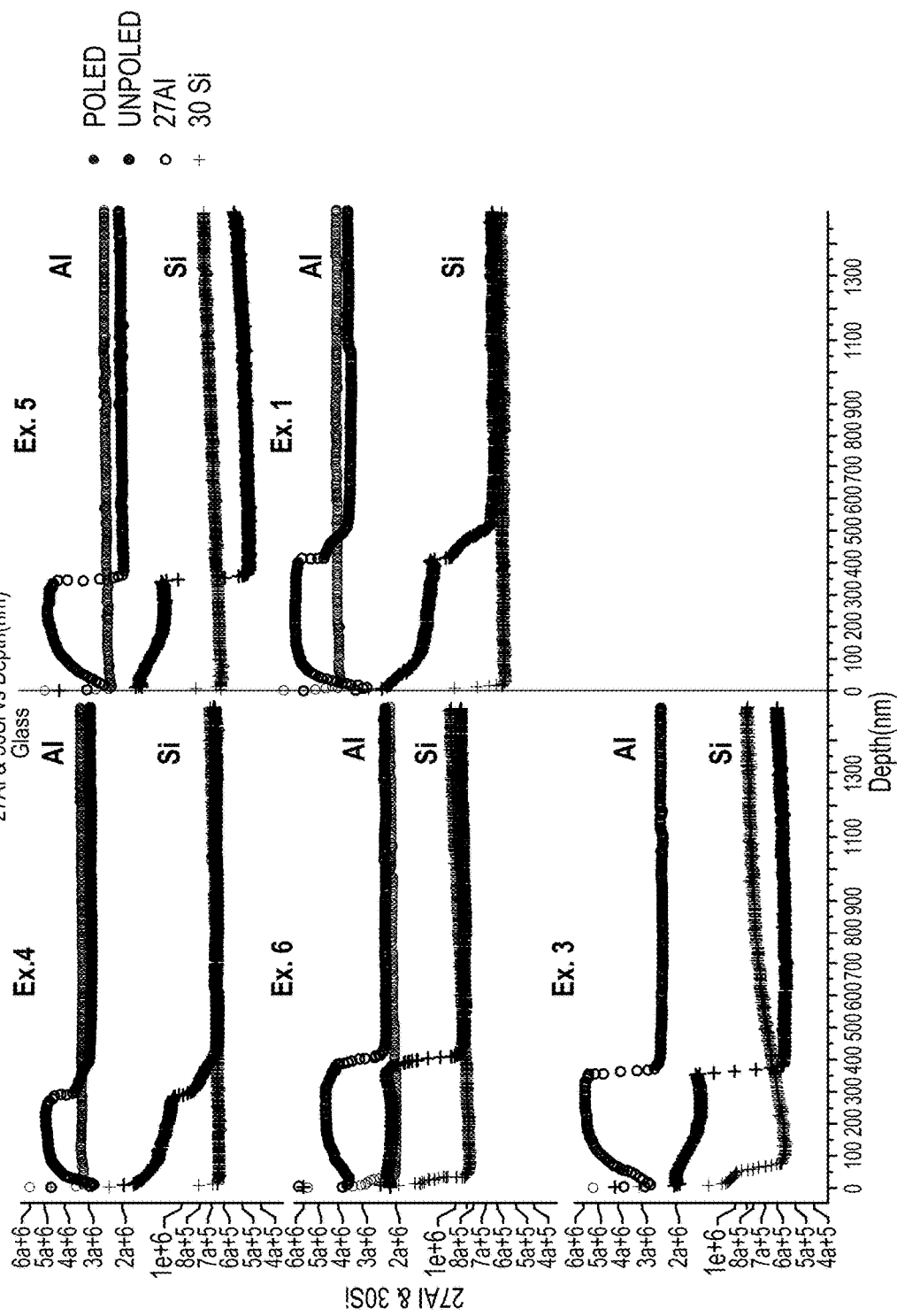
FIG. 5 shows SIMS depth profiles for aluminum and silicon on positively-biased surface of select thermally poled glasses of Example I.

The presence, depth, and composition of the alkali-depleted surface layers were evaluated using secondary-ion-mass-spectrometry (SIMS). The results of these analyses are summarized in FIGS. 3A-3L, 4 and 5. In FIGS. 3A-3L, the SIMS elemental depth profiles are presented as concentration of sodium (23Na) on the positively biased surface as a function of depth (nm). In FIG. 4, the SIMS elemental depth profiles are presented as concentration of hydrogen on the positively biased surface as a function of depth (nm). In FIG. 5, the SIMS elemental depth profiles are presented as concentration of silicon (30Si) and aluminum (27Al) on the positively biased surface as a function of depth (nm). For comparison, SIMS elemental depth profiles for the same glass sheets but not subjected to thermal poling are also shown.

FIGS. 3A-3L, show the creation and presence of alkali-depleted surface layers having a thickness in the range from about 300 nm to about 500 nm, in a wide variety of glass compositions.

FIG. 4 shows the SIMS depth profiles for hydrogen (H) on the positively-biased surface of a variety of poled glasses, as compared to profiles for unpoled precursor glass. Results demonstrate the fact that the alkali-depleted surface layers do not contain substantial hydrogen (relative to unpoled glass sheets having the same compositions). Without being bound by theory, it is believed that the lack of hydrogen in the alkali-depleted surface layer plays a role in predicting the glass structure of the resulting thermally-poled glass sheet; as alkali is eliminated from the alkali-depleted surface layer, the atomic structure in the alkali-depleted surface layer is encouraged to adapt to charge-compensate 4-coordinated aluminum by forming oxygen triclusters, without hydrogen being present as an alternate means of charge-compensation.

FIG. 5 shows representative SIMS depth profiles for aluminum (Al) and silicon (Si) on positively-biased surface of select Examples, as compared to profiles for unpoled precursor glass. FIG. 5 shows the alkali-depleted surface layers are composed primarily of $Al_2O_3$ and $SiO_2$.

X-ray photoelectron spectroscopy (XPS) analyses were performed to evaluate and quantify the composition of the top 5 nm to about 10 nm of the alkali-depleted surface layer for additional contamination, and to corroborate the SIMS findings. High-resolution XPS analyses were also performed to evaluate the connectivity of the glass structure, as evaluated through detection (or lack thereof) of non-bridging oxygens. In addition, Example 8 was briefly HF-etched to evaluate glass structure below the immediate surface, but still within the alkali-depleted surface layer; XPS results for Example 8 after etching essentially confirmed that the etch depth was within the depth of the alkali-depleted surface layer. The results are shown in Tables 2-3 and FIGS. 6-8.

TABLE 2

XPS data for the surface composition of the positively-biased surface of select Examples.

| | | XPS concentration (atom %) | | | |
|---|---|---|---|---|---|
| Example | State | O | Si | Al | Na |
| 7 | Poled | 66.1 | 25.2 | 8.7 | 0.0 |
| 11 | Poled | 66.3 | 31.3 | 2.5 | 0.0 |
| 9 | Poled | 65.9 | 26.3 | 7.8 | 0.0 |
| 1 | Poled | 65.1 | 30.7 | 4.2 | 0.0 |
| 8 | Poled | 66.1 | 25.7 | 8.2 | 0.0 |
| 2 | Poled | 65.8 | 28.8 | 5.4 | 0.0 |
| 3 | Poled | 66.2 | 29.4 | 4.4 | 0.0 |
| 4 | Poled | 65.7 | 30.1 | 4.2 | 0.0 |
| 5 | Poled | 65.6 | 29.2 | 5.2 | 0.0 |
| 6 | Poled | 65.3 | 31.3 | 3.5 | 0.0 |
| 15 | Poled | 65.3 | 28.8 | 5.9 | 0.0 |
| 18 | Poled | 65.5 | 26.1 | 8.3 | 0.0 |
| 8 | Unpoled | 64.8 | 21.3 | 11.4 | 2.5 |
| 11 | Unpoled | 62.7 | 26.6 | 2.7 | 7.9 |
| 3 | Unpoled | 63.1 | 23.2 | 6.3 | 7.4 |
| 8 (1% HF, 1 min.) | Poled | 64.5 | 23.1 | 12.3 | 0.1 |

Figure 6:
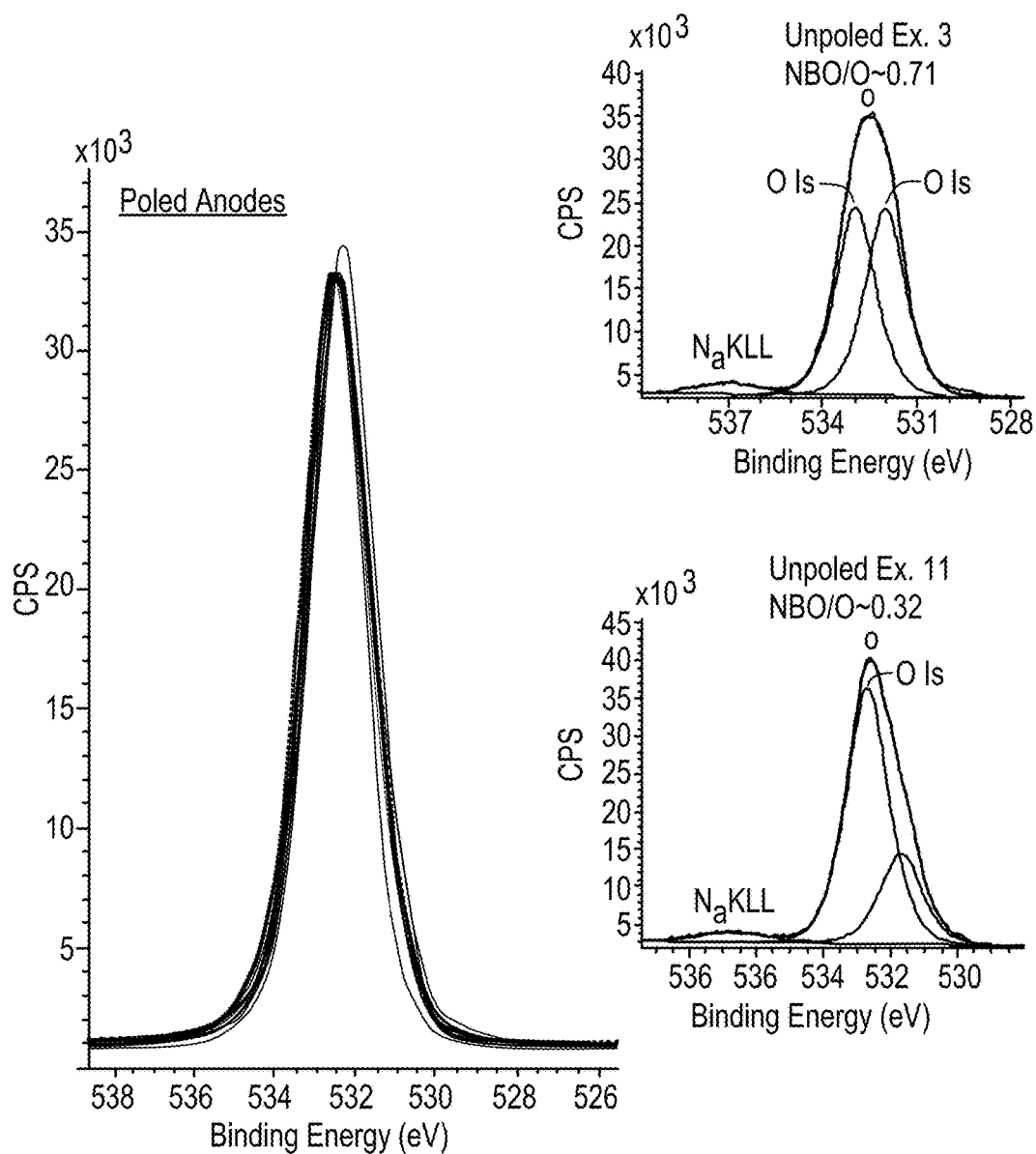
FIG. 6 shows high-resolution XPS O1s curve-shapes for positively-biased surfaces of the alkali-depleted surface layers of select glasses of Example I, compared to select unpoled precursor glasses.

FIG. 6 shows a high-resolution XPS O1s curve-shapes for positively-biased surfaces of a representative variety of thermally poled glasses (left), as compared to select unpoled precursor glasses (right). The unpoled glasses have M./AM and show asymmetric lineshapes consistent with at least 2 peak components that correspond to bridged and non-bridging oxygen in the glass structure. Results for the poled surfaces consistently show a O1s lineshape best-fit by a single, symmetric, Gaussian-Lorentzian peak, and thus indicate only bridged oxygen (with no non-bridging oxygen) in the alkali-depleted surface layers, which is consistent with a well-connected network populated by 4-coordinated Al and Si (with oxygen triclusters), as opposed to non-bridging oxygens associated with 5,6-coordinated Al.

In survey scans, no other elements were detected in any significant concentration, thus refuting the possibility of additional elements entering the alkali-depleted glass layer and participating in the network structure.

Figure 7:
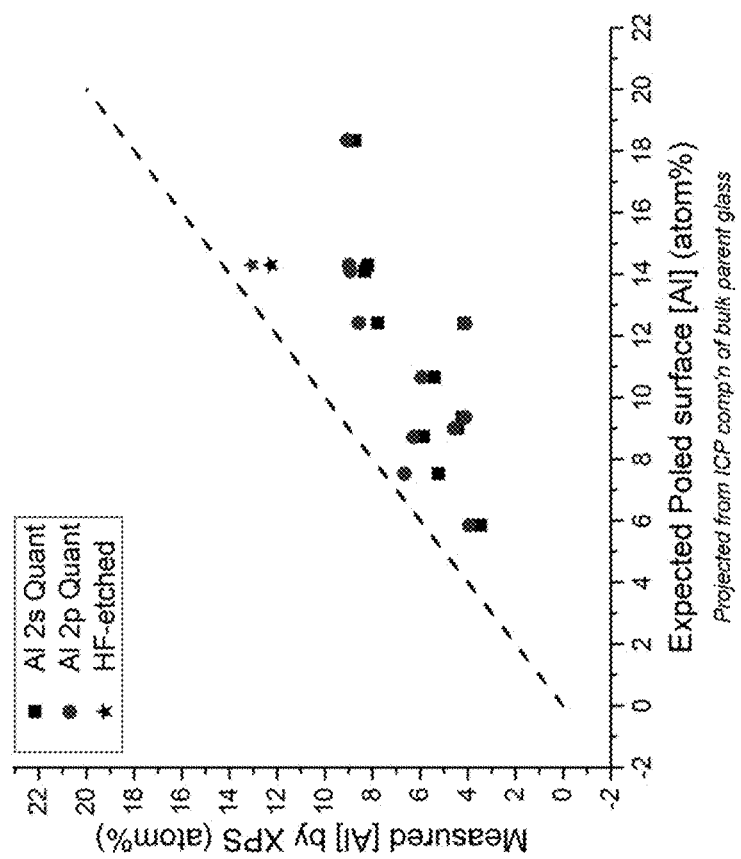
FIG. 7 shows a correlation plot of results for Al concentration, comparing "expected" concentration after Na-depletion (based on bulk ICP composition data)

FIG. 7 shows a correlation plot of results for Al concentration, comparing XPS results to the "expected" surface compositions after Na-depletion, as based on projections of bulk ICP composition data (see Table 1 and FIG. 2B; ICP data converted to atom %). Results indicate that the surfaces were slightly depleted in Al (in addition to Na), which is consistent with Al profiles shown in FIG. 5; while this feature is detectable, it is not believed to be a very relevant to the conclusion of alkali-depleted surface layer comprising a unique structure/composition throughout its depth. Table 3 provides XPS results for the poled layer surface, converted to mole %, compared to the "expected" surface compositions after Na-depletion, as based on projections of bulk ICP composition data (see Table 1 and FIG. 1(b); ICP data converted to mole %).

TABLE 3

XPS results for alkali-depleted surface layer, converted to mole %, compared with ICP projections for layer composition.

| | | XPS (mol %) | | ICP Bulk projection (mol %) | |
|---|---|---|---|---|---|
| Example | State | $Al_2O_3$ | $SiO_2$ | $Al_2O_3$ | $SiO_2$ |
| 7 | Poled | 14.8 | 85.2 | 33.7 | 66.3 |
| 11 | Poled | 3.8 | 96.2 | 24.1 | 75.9 |
| 9 | Poled | 12.9 | 87.1 | 21.3 | 78.7 |
| 1 | Poled | 6.3 | 93.7 | 21.3 | 78.7 |
| 8 | Poled | 13.8 | 86.2 | 25 | 75 |
| 2 | Poled | 8.6 | 91.4 | 17.9 | 82.1 |
| 3 | Poled | 7 | 93 | 14.9 | 85.1 |
| 4 | Poled | 6.6 | 93.4 | 15.5 | 84.5 |
| 5 | Poled | 8.2 | 91.8 | 12.2 | 87.8 |
| 6 | Poled | 5.2 | 94.8 | 9.4 | 90.6 |
| 15 | Poled | 9.2 | 90.8 | 14.4 | 85.6 |
| 18 | Poled | 13.7 | 86.3 | 24.6 | 75.4 |
| 8 | Unpoled | | | 25 | 75 |
| 11 | Unpoled | | | 24.1 | 75.9 |
| 3 | Unpoled | | | 14.9 | 85.1 |
| 8 (1% HF, 1 min.) | Poled | 21 | 79 | 25 | 75 |

Figure 8:
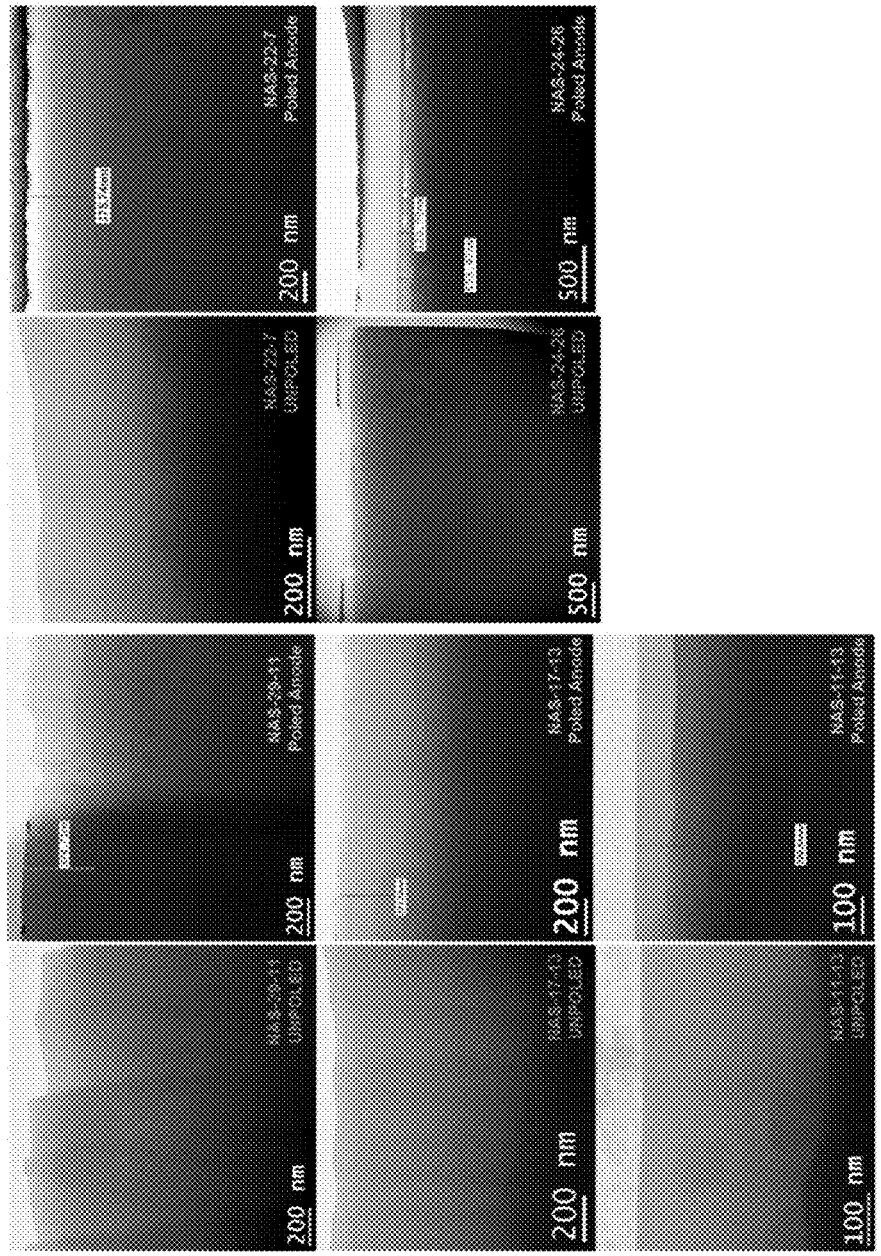
FIG. 8 shows a representative series of surface-cross-sectional TEM images, comparing unpoled precursor glasses with the alkali-depleted surface layers of the thermally poled glasses.

FIG. 8 shows a representative series of surface-cross-sectional transmission electron microscopy (TEM) images to evaluate the morphology of the layers at the nanoscale, examine any evidence of phase-separation or crystallization, and to cross-check layer thickness. In FIG. 8, the alkali-depleted surface layers formed by thermal poling were compared to unpoled precursor glasses. Electron-energy-loss spectroscopy (EELS), and particularly Energy-loss Near-Edge Spectroscopy (ELNES), were also performed in the TEM to evaluate atomic structural environment for certain elements in the layer.

FIG. 8 corroborates the presence of an alkali-depleted surface layer and the measured thickness by SIMS, and further confirms that the alkali-depleted surface layers are homogeneous, without any detectable phase-separation or crystallization. This is surprising because analogous $Al_2O_3$—$SiO_2$ glasses of the same composition as the alkali-depleted surface layer, formed by conventional melting would have phase-separated. The compositions within the alkali-depleted surface layers are shown cover the range from about 15 wt % to about 46 wt % $Al_2O_3$ based on ICP data. Phase separation occurs for binary $Al_2O_3$—$SiO_2$ glasses at above roughly 12 wt % $Al_2O_3$, or approximately 7.7 mol % $Al_2O_3$, or about 4.9 atom % Al.

Results shown in FIG. 8 also corroborated the measured layer thicknesses by SIMS, and that the same behaviors are observed, irrespective of the structure/composition of the precursor glass.

On occasion, a small amount (<1%) Pt could be detected on the surfaces, and was later traced to small particles of Pt left on the surface from the electrodes. These particles were sporadic and did not enter the glass structure, and as such could be ignored for the purposes of the conclusions around the functional behavior of the alkali-depleted surface layers.

Low levels of adventitious carbon was present on the surfaces due to adsorbed atmospheric contamination, and which was corrected for in the standard way to those knowledgeable in the art.

FIG. 9 presents cross-sectional ELNES analysis at the Al L-edge, Si K-edge, and O K-edge for poled surfaces or the alkali-depleted surface layer, in comparison with the alkali-containing bulk. Within resolution limits of the technique, results indicate no discernible differences in the structural atomic environments of aluminum or silicon in the alkali-depleted surface layers relative to the corresponding environment in the alkali-containing bulk (or precursor glass). These results indicate that aluminum and silicon are both are in a 4-coordinated state. The results are similar for oxygen, with the exception of detectable variations in pre-peak activity.

Figure 10:
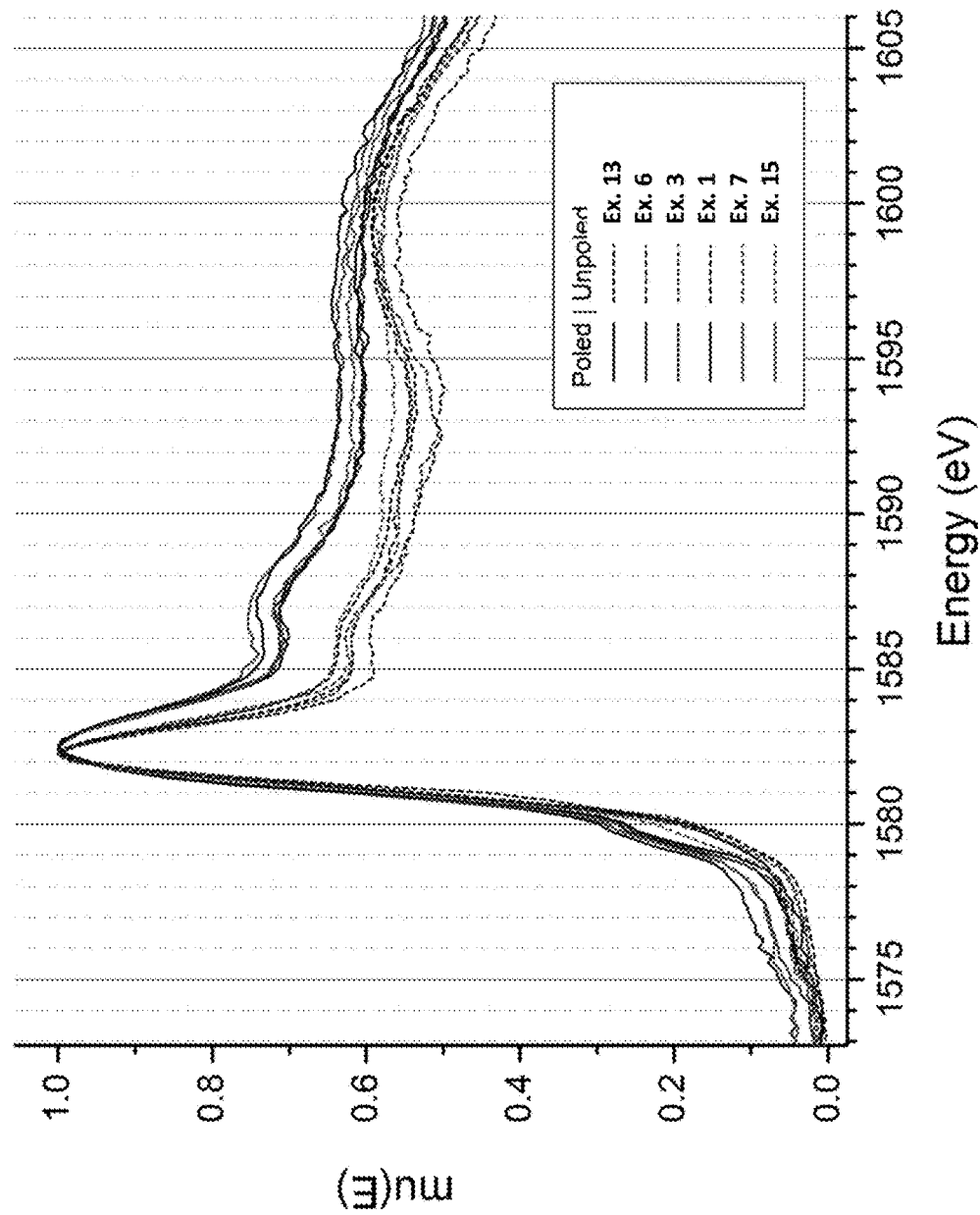
FIG. 10 shows a normalized Al K-edge XANES-TEY spectra for positively-biased surface of select thermally poled glasses of Example I, as compared to spectra for unpoled precursor glasses.

X-ray absorption near-edge spectroscopy (XANES) studies were pursued at a synchrotron facility to understand whether the structures of the alkali-depleted surface layer were uniquely differentiated from the precursor glass. Data were acquired in total-electron-yield (TEY) mode to ensure results were representative of the structure of the alkali-depleted surface layer (i.e. surface-sensitive mode, top 5 nm to 10 nm of the layer), and were performed at both Al K-edge and O K-edge. FIG. 10 summarizes normalized Al K-edge XANES-TEY spectra for positively-biased surface of a representative series of glass substrates subjected to thermal poling, as compared to spectra for precursor glasses that were not subjected to thermal poling. The results show generally consistent trend in terms of changes to the XANES spectra on going from poled to unpoled state.

Figure 11:
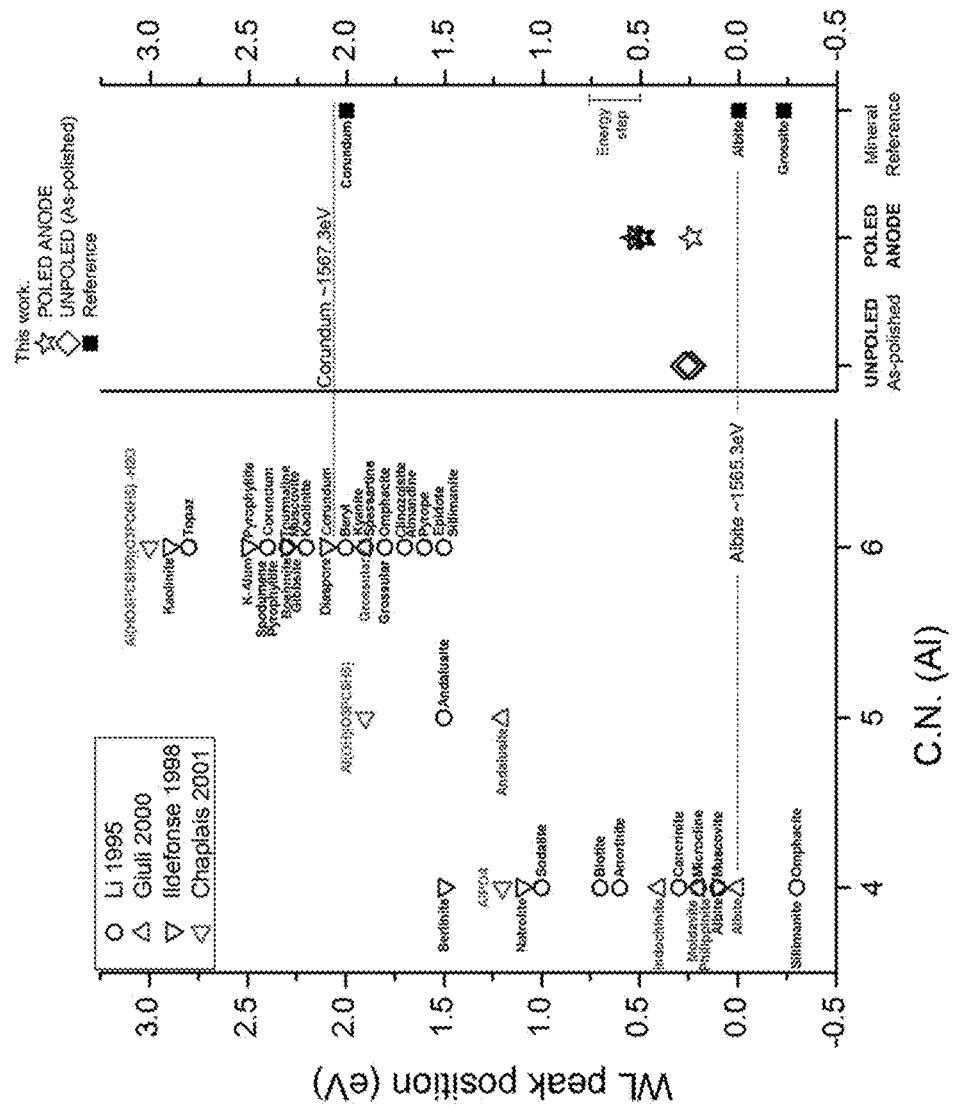
FIG. 11 shows a comparison of a primary peak position ("white line") for thermally poled and unpoled glasses, as compared with reference minerals.

FIG. 11 summarizes the results from analysis of the Al K-edge XANES data, particularly in terms of the peak position of the primary absorption peak, or "white-line". Comparison of primary peak position ("white line") for glasses subjected to thermal poling and glasses not subjected to thermal poling, as compared with reference minerals analyzed in this study, as well as from literature. Results definitively indicate that aluminum is 4-coordinated in the alkali-depleted surface layers (and in the precursor glass or alkali-containing bulk glass).

Without being bound by theory, based on the near-completion depletion of alkali in the alkali-depleted surface layer, the absence of hydrogen in the alkali-depleted surface layer, absence of any foreign/guest ions that might otherwise charge compensate for aluminum, lack of non-bridging oxygens in the alkali-depleted surface layer, and a homogenous glass morphology in the alkali-depleted surface layer, it is believed that formation of oxygen in a 3-coordinated state is at least one notable charge-compensating mechanisms for 4-coordinated aluminum. Moreover, it is believed that oxygen in a 3-coordinated state is present in relatively high concentrations in the glass network of the alkali-depleted surface layer. Moreover, it is believed that the alkali-depleted surface layer includes a highly-connected, non-bridging oxygen-free network, with potential for many unique physical properties. Theoretical concentrations of oxygen triclusters—in the absence of non-bridging oxygen or high-coordinated Al—may be one such oxygen tricluster for every aluminum atom in the network. In one or more embodiments, the oxygen in a 3-coordinated state may account for about 4-19% of the total oxygen present in the alkali-depleted surface layer, based on XPS data (with some Al depletion). In some embodiments, the oxygen in a 3-coordinated state may account for from about 5% to about 29% of the total oxygen present, based on ICP projections of composition throughout the layer (with no Al depletion).

To further confirm the structure of the alkali-depleted surface layer, the outermost few nanometers of the alkali-depleted surface layer were etched away, followed by XPS and XANES analysis of the etched surface. Results of this experiment are summarized in FIGS. 12A and 12B.

Figure 12A:
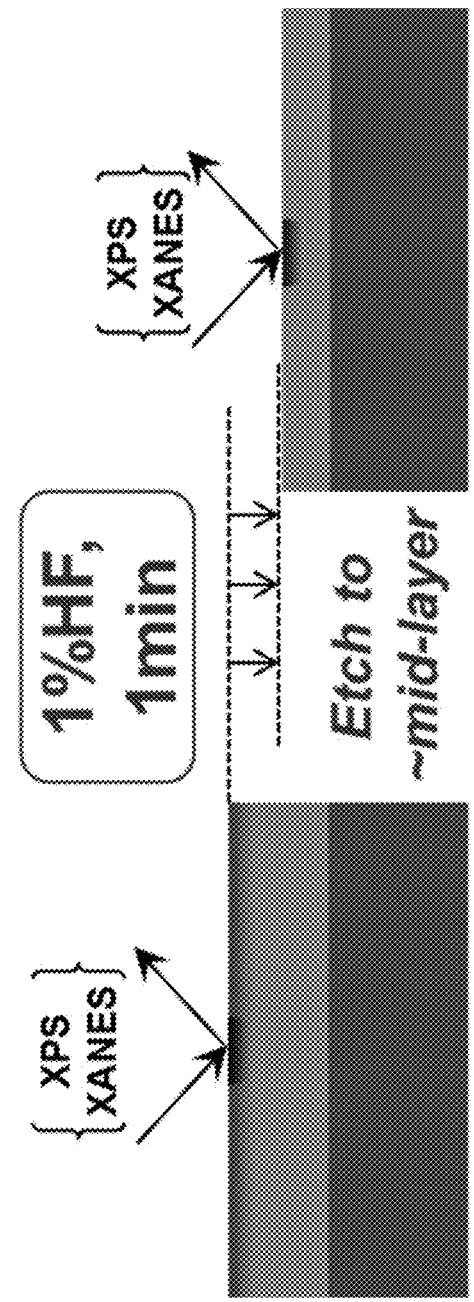
FIG. 12A is a schematic of a thermally poled glass being etched with HF solution.
Figure 12C:
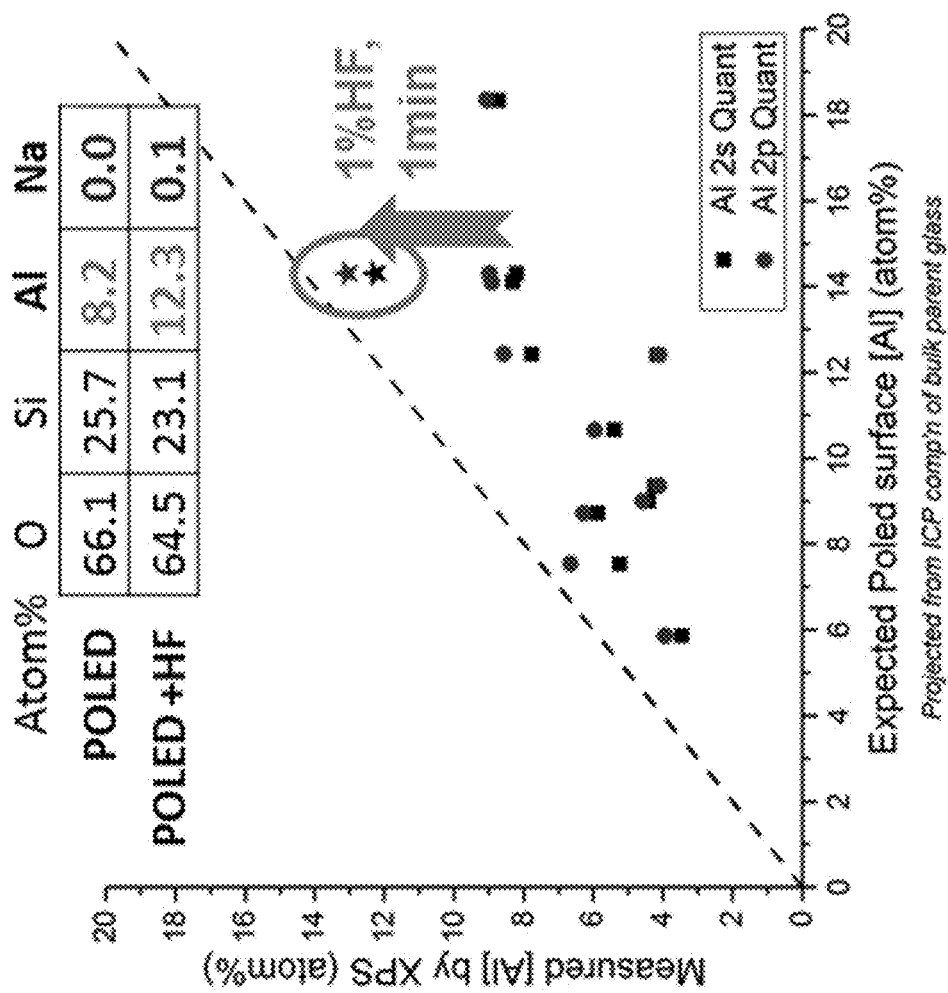
FIG. 12C shows XPS results of the glass of FIG. 12A after etching.

FIG. 12A shows a schematic for the experiment, where the alkali-depleted surface layer was partially etched and re-evaluated. FIG. 12B shows the SIMS profiles (before etching), corroborating the Al-depleted zone within the alkali-depleted surface layer. The sample was etched for 1 minute in 1% HF solution to evaluate glass structure below the immediate surface of the sample (slightly Al-depleted, as shown in SIMS profiles), but still within the alkali-depleted surface layer. In FIG. 12C, XPS results show that this etching yielded aluminum concentrations approaching the expectation value from ICP data (see FIG. 7), but were still within alkali-depleted surface layer, as indicated by sodium being detected at only the 0.1 atomic % level. Accordingly, the aluminum concentration throughout most of the thickness of the alkali-depleted surface layer is expected to be well-represented by projections of bulk ICP composition, while XPS data for the unetched poled surfaces underrepresents the aluminum concentration in most of the alkali-depleted surface layer.

Figure 12D:
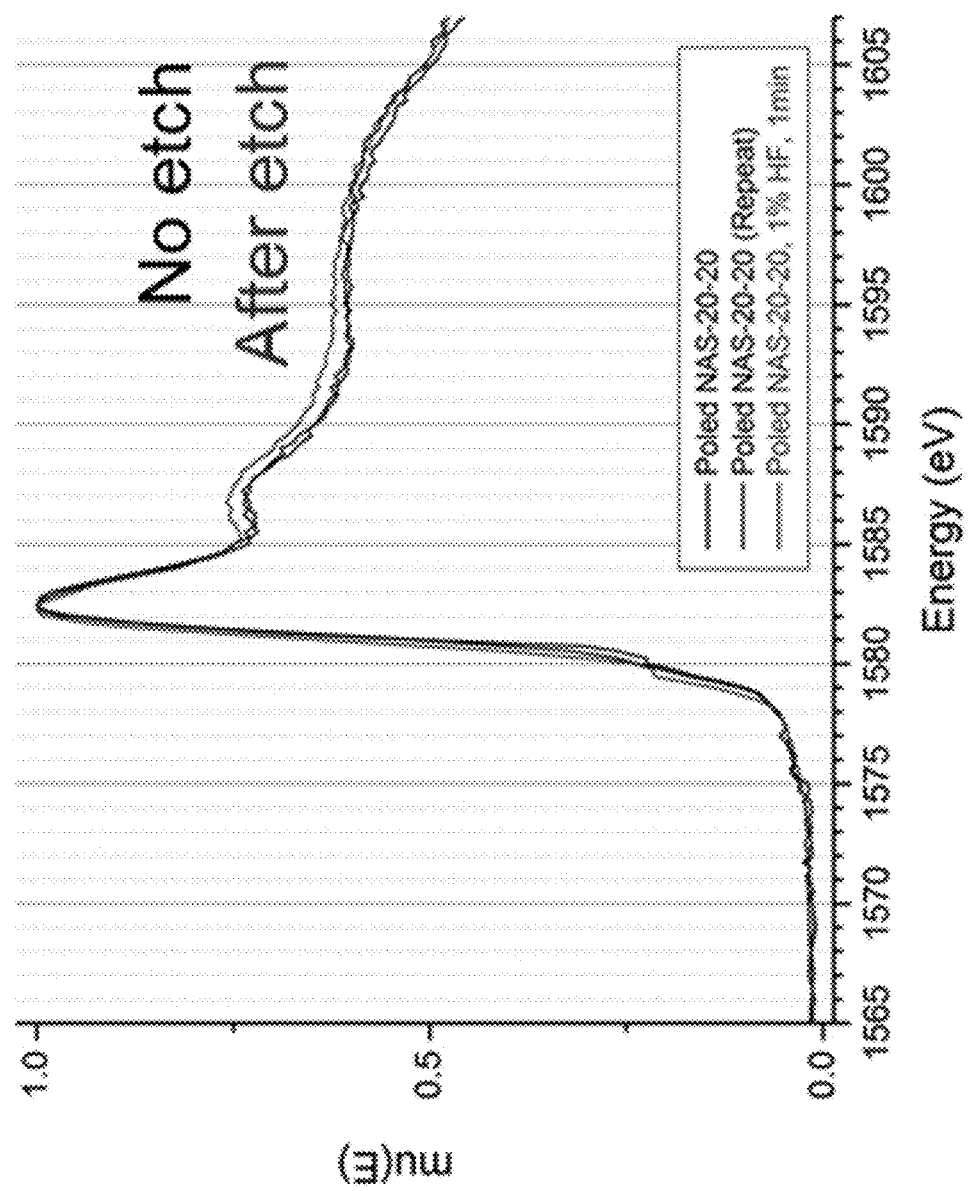
FIG. 12D shows XANES of the glass of FIG. 12A after etching.

FIG. 12(d) summarizes XANES results on the same poled surface before/after etching, and confirms that the aluminum environment is consistent on the etched sample at depth somewhere within the alkali-depleted surface layer. These findings confirm the presence of a 4-coordinated aluminum environment and corresponding oxygen in a 3-coordinated state throughout the entire alkali-depleted surface layer thickness. The higher aluminum concentration just below the immediate surface of the alkali-depleted surface layer indicates a higher structural concentration of oxygen triclusters, thus imparting an even greater impact to physical properties.

Figure 13A:
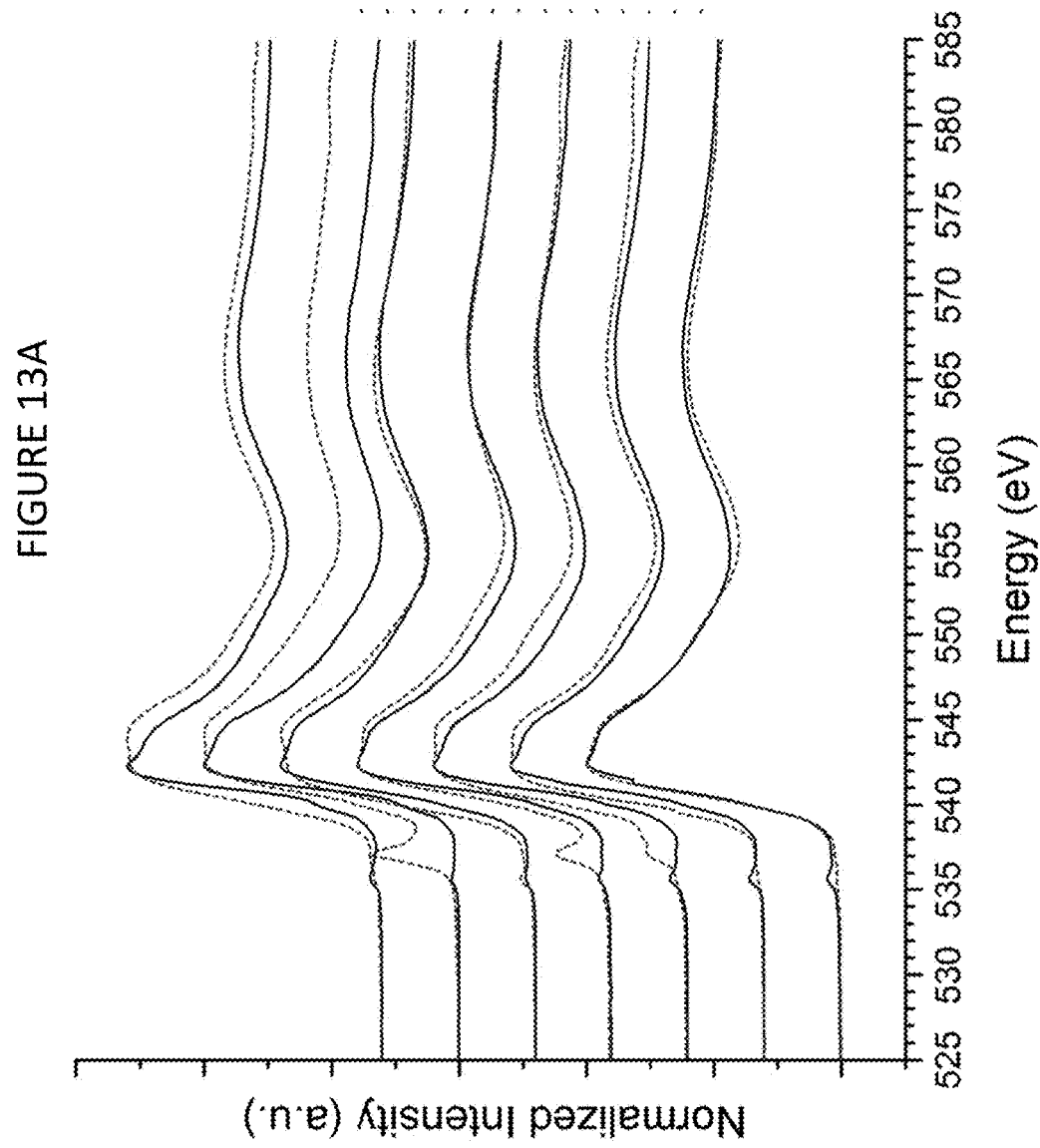
FIG. 13A shows a normalized O K-edge XANES-TEY spectra for positively-biased surface of a representative series of thermally poled sodium-aluminosilicate glasses, as compared to spectra for unpoled precursor sodium-aluminosilicate glasses.
Figure 13B:
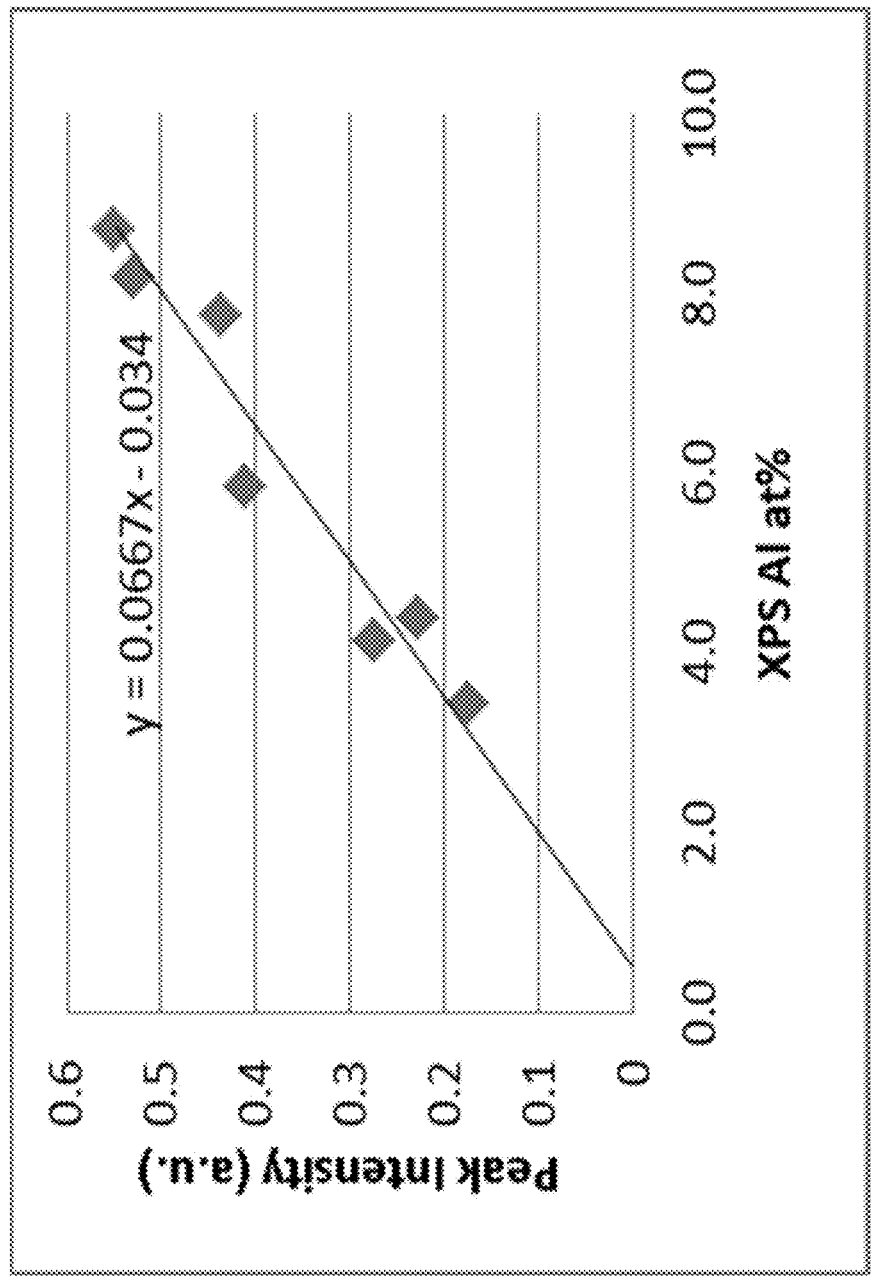
FIG. 13B is a representative example of curve-fitting procedure applied to O K-edge data, wherein the shaded component is believed to correspond to potentially correspond to oxygen triclusters in the alkali-depleted surface layers after thermal poling.
Figure 13C:
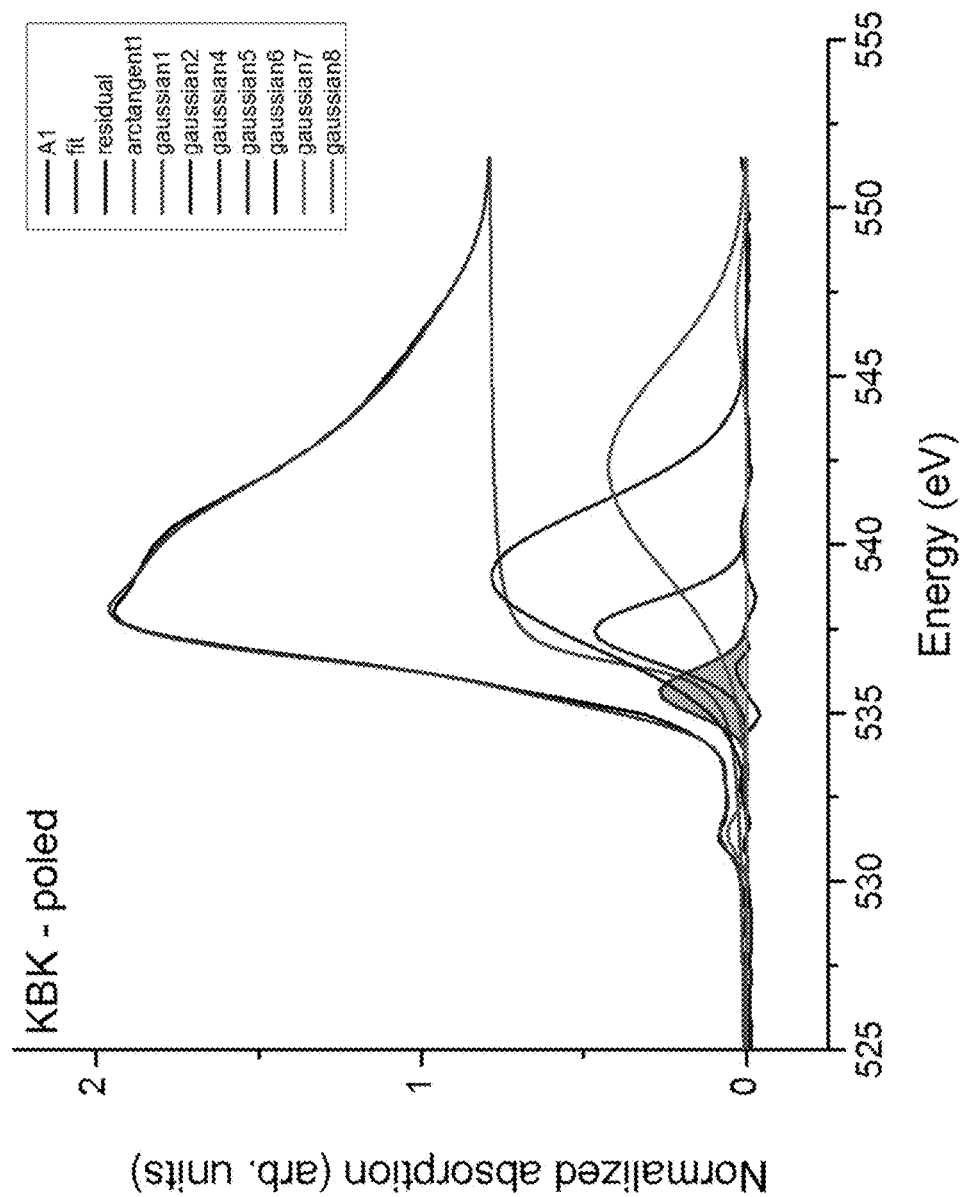
FIG. 13C is a plot of the shaded component of O XANES intensity in FIG. 13B versus Al concentration by XPS.

Oxygen K-edge TEY-XANES was also performed on the thermally poled glasses to confirm the presence of oxygen in a 3-coordinated state in the alkali-depleted surface layer. The results are shown in FIG. 13A, which shows normalized O K-edge XANES-TEY spectra for positively-biased surface of a representative series of glasses that are thermally poled, as compared to spectra for unpoled precursor glasses. FIG. 13B shows a representative example of curve-fitting procedure applied to O K-edge data, wherein the shaded component is believed to potentially correspond to oxygen triclusters in the alkali-depleted surface layers. This peak appears at this energy in grossite mineral reference (which contains oxygen in a 3-coordinated state out of every 7 total oxygen in unit cell), but not in albite mineral reference (which has no oxygen in a 3-coordinated state). In FIG. 13C, the intensity of the shaded component is plotted versus aluminum concentration by XPS, showing a significant correlation. These results provide some potential direct evidence for the presence of oxygen in a 3-coordinated state in tandem with increasing concentrations of 4-coordinated Al in the alkali-depleted surface layer.

Figure 14A:
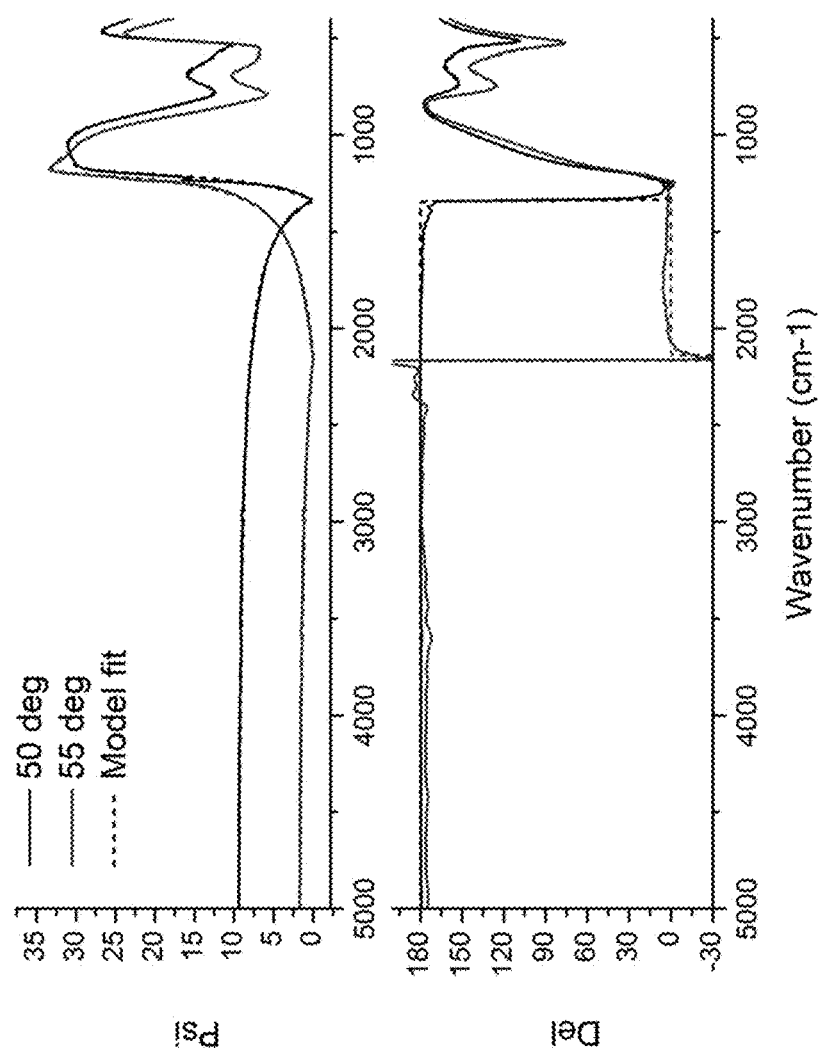
FIG. 14A shows ellipsometric Psi and Del spectra before and after thermal poling, as measured by IR-VASE for a representative sodium aluminosilicate glass before thermal poling.
Figure 14B:
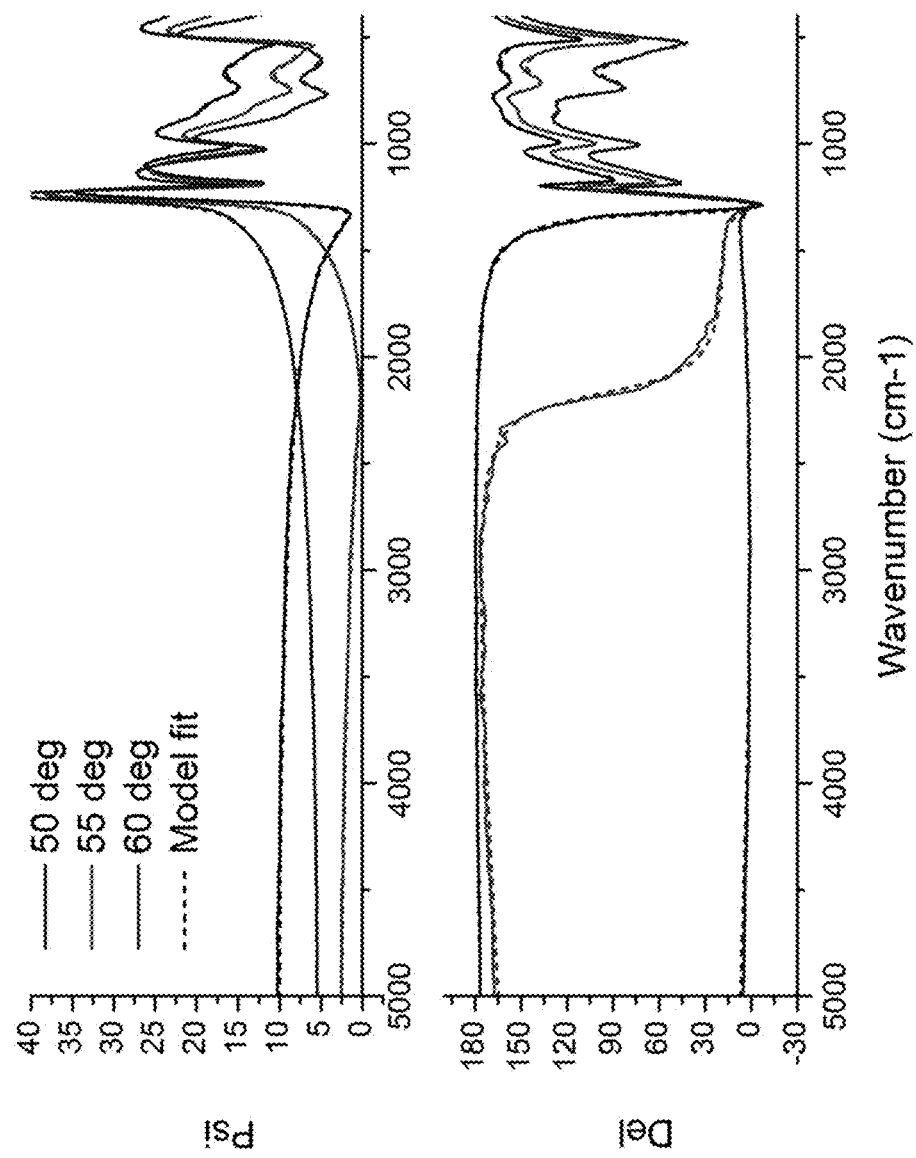
FIG. 14B shows ellipsometric Psi and Del spectra before and after thermal poling, as measured by IR-VASE for the same sodium aluminosilicate glasses as FIG. 14A after thermal poling.
Figure 14C:
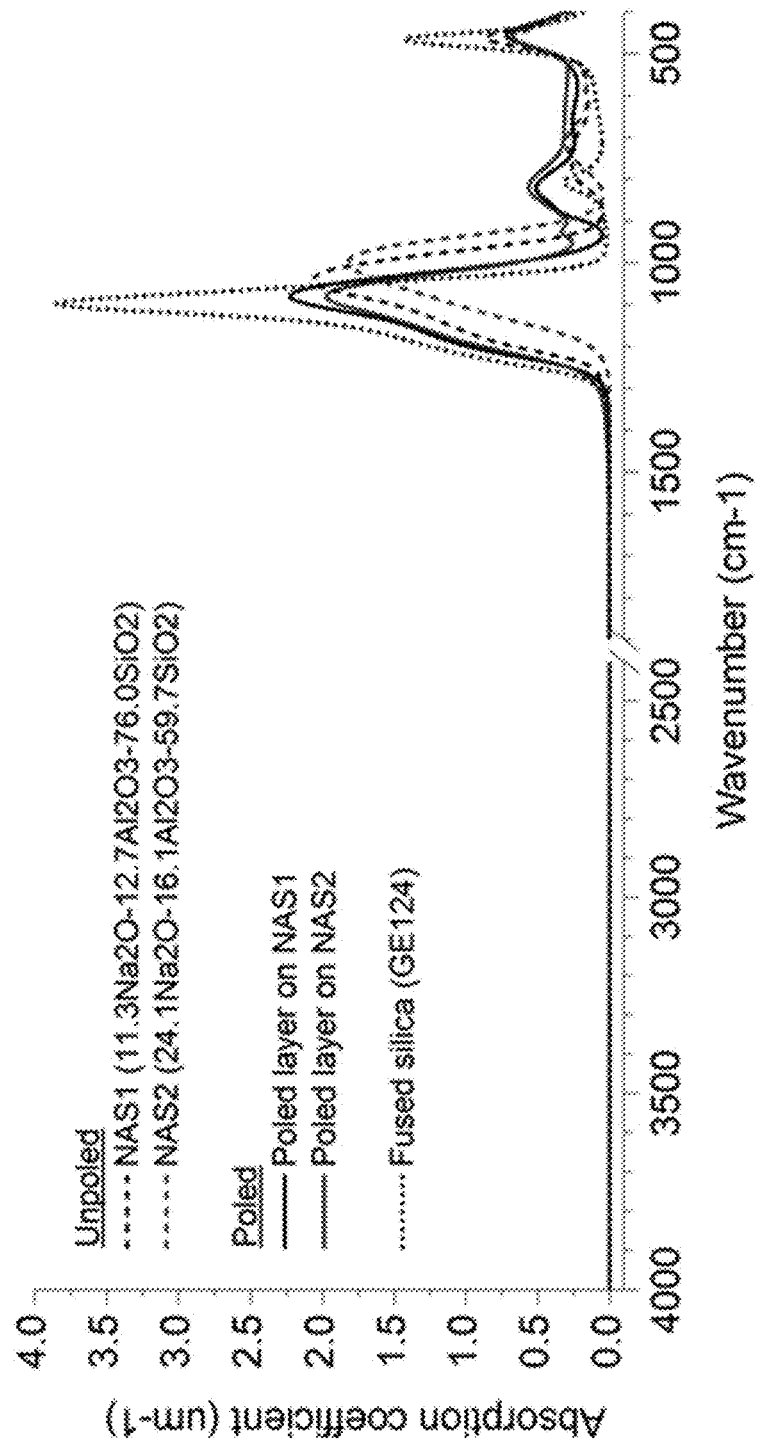
FIG. 14C shows modeled Psi/Del spectra, and absorption coefficient spectra for the alkali-depleted surface layers on two representative sodium aluminosilicate glasses, each compared to spectra of the precursor glass, and further referenced to fused silica.

Infrared variable-angle spectroscopic ellipsometry (IR-VASE) was performed on the thermally poled glasses. The results are shown in FIGS. 14A-14C and show the absence of hydrogen from the structure of the alkali-depleted surface layer.

The refractive index of the alkali-depleted surface layer was measured and compared to the refractive index of the glass before thermal poling. The refractive index of the alkali-depleted surface layer was found to be less than the refractive index of the precursor glass. In some embodiments, the alkali-depleted surface layer exhibited a refractive index in the range of 1.4 to 1.5. This is of generally sufficient index contrast and thickness to produce a visible anti-reflection effect in the thermally poled glasses.

It will be apparent to those skilled in the art that various modifications and variations can be made without departing from the spirit or scope of the disclosure.

What is claimed is:

1. A glass substrate comprising:
   an alkali-containing bulk having an aluminosilicate composition comprising from about 7 mol % to about 26 mol % $Al_2O_3$ and at least 8 mol % $Na_2O$; and
   an alkali-depleted surface layer,
   wherein the alkali-depleted surface layer is amorphous and comprises a substantially homogenous composition,
   wherein the alkali-depleted layer comprises a thickness in the range from about 10 nm to about 3000 nm, and
   further wherein the alkali-depleted surface layer comprises about 0.5 atomic % alkali or less.

2. The glass substrate of claim 1, wherein the alkali-depleted surface layer is substantially free of crystallites.

3. The glass substrate of claim 1, wherein the alkali-containing bulk and the alkali-depleted surface layer comprise $Al_2O_3$ and $SiO_2$, wherein the alkali-depleted surface layer comprises an atomic structure comprising aluminum substantially in a 4-coordinated state.

4. The glass substrate of claim 3, wherein the atomic structure of the alkali-depleted surface layer comprises silicon in a 4-coordinated state.

5. The glass substrate of claim 3, wherein less than about 5 % of the aluminum in the alkali-depleted surface layer is in coordinated state other than the 4-coordinated state.

6. The glass substrate of claim 3, wherein the alkali-depleted surface layer comprises a total amount of oxygen, wherein from about 3 % to about 30 % by fraction of the total amount of oxygen is in a 3-coordinated state.

7. The glass substrate of claim 6, wherein the alkali-depleted surface layer is substantially free of non-bridging oxygens.

8. The glass substrate of claim 7, wherein the alkali-containing bulk comprises non-bridging oxygens and bridging oxygens.

9. The glass substrate of claim 7, wherein the alkali-containing bulk is substantially free of non-bridging oxygens.

10. The glass substrate of claim 3, wherein the alkali-containing bulk further comprises an alkali-metal oxide selected from $Li_2O$, $K_2O$, $Rb_2O$ and $Cs_2O$.

11. The glass substrate of claim 3, wherein the alkali-depleted surface layer comprises $Al_2O_3$ in the range from about 1 mol % to about 50 mol %.

12. The glass substrate of claim 3, wherein the alkali-depleted surface layer comprises a binary $Al_2O_3$—$SiO_2$ composition.

13. A glass substrate comprising:
    a thickness t;
    an alkali-containing bulk having a bulk refractive index and an aluminosilicate composition comprising from about 7 mol % to about 26 mol % $Al_2O_3$ and at least 8 mol % $Na_2O$; and
    an alkali-depleted surface layer comprising a thickness in the range from about 10 nm to about 3000 nm,
    wherein the alkali-depleted surface layer comprises a layer refractive index that is less than the bulk refractive index, and
    further wherein the alkali-depleted surface layer comprises about 0.5 atomic % alkali or less.

14. A method of forming a glass substrate with a modified surface layer comprising:
    providing a glass substrate comprising a concentration of alkali, a glass transition temperature (Tg) and a surface layer, the glass substrate further comprising an aluminosilicate composition comprising from about 7 mol % to about 26 mol % $Al_2O_3$ and at least 8 mol % $Na_2O$;
    reducing the concentration of alkali in the surface layer,
    wherein the reducing comprises contacting a surface of the glass substrate with an electrode and subjecting the glass substrate to a thermal poling,
    wherein the electrode comprises an anode in contact with an anodic surface of the glass substrate and a cathode in contact with the cathodic surface of the glass substrate,
    wherein the thermal poling comprises applying voltage to the glass substrate such that the anode is positively-biased relative to the glass substrate to induce alkali depletion at the anodic surface of the glass,
    wherein the anode is a non-porous film comprising an oxidation-resistant conductive film or a noble metal, and the cathode is a graphite film,
    wherein the surface layer with reduced concentration of alkali comprises a substantially homogenous composition, and
    further wherein the surface layer with reduced concentration of alkali comprises about 0.5 atomic % alkali or less and a thickness in the range from about 10 nm to about 3000 nm.

15. The method of claim 14, wherein the thermal poling comprises heating the glass substrate and electrode to a temperature below Tg prior to applying voltage to the glass substrate.

16. The method of claim 14, wherein the thermal poling comprises applying voltage in the range from about 100 volts to about 10,000 volts to the glass substrate for a duration in the range from about 1 minute to about 6 hours.

17. The method of claim 14, wherein the glass substrate is subjected to the thermal poling under vacuum, in an inert gas environment, or a permeable gas environment.

* * * * *